United States Patent
Kimura et al.

(10) Patent No.: US 10,382,612 B2
(45) Date of Patent: Aug. 13, 2019

(54) BUSINESS SUPPORT SYSTEM, BUSINESS SUPPORT METHOD, INFORMATION PROCESSING APPARATUS, COMMUNICATION DEVICE, AND CONTROL METHODS AND CONTROL PROGRAMS OF INFORMATION PROCESSING APPARATUS AND COMMUNICATION DEVICE

(71) Applicant: NEC Corporation, Tokyo (JP)

(72) Inventors: Satoshi Kimura, Tokyo (JP); Kazumi Hatakeyama, Tokyo (JP)

(73) Assignee: NEC Corporation, Tokyo (JP)

( * ) Notice: Subject to any disclaimer, the term of this patent is extended or adjusted under 35 U.S.C. 154(b) by 14 days.

(21) Appl. No.: 15/464,427

(22) Filed: Mar. 21, 2017

(65) Prior Publication Data

US 2017/0289342 A1 Oct. 5, 2017

(30) Foreign Application Priority Data

Mar. 31, 2016 (JP) .................. 2016-071601

(51) Int. Cl.
*H04M 1/725* (2006.01)
*G06Q 10/10* (2012.01)
(Continued)

(52) U.S. Cl.
CPC .... *H04M 1/72566* (2013.01); *G06Q 10/1091* (2013.01); *H04M 1/72577* (2013.01); *G06F 1/266* (2013.01); *H04L 67/10* (2013.01)

(58) Field of Classification Search
CPC ..... G06F 1/266; G06Q 10/1091; H04L 67/10; H04M 1/72566; H04M 1/72577
See application file for complete search history.

(56) References Cited

U.S. PATENT DOCUMENTS

2012/0058744 A1* 3/2012 Felt ................ H04M 3/382
                                                    455/414.1
2013/0130651 A1* 5/2013 Deasy .............. H04W 76/10
                                                    455/411
(Continued)

FOREIGN PATENT DOCUMENTS

JP      2013-190995 A   9/2013
WO   WO-2011/102447 A1  8/2011

*Primary Examiner* — Liton Miah
(74) *Attorney, Agent, or Firm* — Wilmer Cutler Pickering Hale and Dorr LLP

(57) ABSTRACT

This invention is directed to a business support system that controls business use of a communication device based on a work time without user's awareness. The business support system includes a work time register that registers a work time, and a business use controller that, in reference to the work time register, starts business use of a communication device by a business application for supporting the business use of the communication device when a current time falls within the work time, and stops the business use of the communication device by the business application when the current time falls outside the work time. For example, the business use controller starts the business use of the communication device by the business application by activating a predetermined program in the communication device, and stops the business use of the communication device by the business application by stopping the predetermined program in the communication device.

20 Claims, 26 Drawing Sheets

(51) Int. Cl.
*G06F 1/26* (2006.01)
*H04L 29/08* (2006.01)

(56) References Cited

U.S. PATENT DOCUMENTS

| | | | |
|---|---|---|---|
| 2013/0143527 A1* | 6/2013 | Randazzo | H04W 48/04 |
| | | | 455/411 |
| 2014/0108491 A1* | 4/2014 | Fan | H04L 67/10 |
| | | | 709/201 |
| 2014/0195927 A1* | 7/2014 | DeWeese | H04L 63/10 |
| | | | 715/750 |

* cited by examiner

//BUSINESS SUPPORT SYSTEM, BUSINESS SUPPORT METHOD, INFORMATION PROCESSING APPARATUS, COMMUNICATION DEVICE, AND CONTROL METHODS AND CONTROL PROGRAMS OF INFORMATION PROCESSING APPARATUS AND COMMUNICATION DEVICE

CROSS REFERENCE TO RELATED APPLICATION

This application claims the benefit of the priority of Japanese Patent Application No. 2016-071601, filed on Mar. 31, 2016, entitled, "BUSINESS SUPPORT SYSTEM, BUSINESS SUPPORT METHOD, INFORMATION PROCESSING APPARATUS, COMMUNICATION DEVICE, AND CONTROL METHODS AND CONTROL PROGRAMS OF INFORMATION PROCESSING APPARATUS AND COMMUNICATION DEVICE," the disclosure of which is hereby incorporated by reference in its entirety.

BACKGROUND OF THE INVENTION

Field of the Invention

The present invention relates to a business support system, a business support method, an information processing apparatus, a communication device, and control methods and control programs of the information processing apparatus and communication device.

Description of the Related Art

In the above technical field, patent literature 1 discloses a technique of displaying a list of a plurality of functional modules determined based on current time information and time information included in schedule information and executing a functional module selected by a user operation. In addition, patent literature 2 discloses a technique of causing an employee to distinguish, based on a word input by kana-kanji conversion, between business use and private use of an communication device that is used at work and privately and separately counting the use time during off-duty hours.

[Patent Literature 1] International Publication No. WO2011/102447

[Patent Literature 2] Japanese Patent Laid-Open No. 2013-190995

SUMMARY OF THE INVENTION

In the techniques described in the above literatures, however, it is determined based on a user operation whether the use of the communication device is business use and private use. Hence, the business use of the communication device cannot be controlled based on the work time without user's awareness.

The present invention enables to provide a technique of solving the above-described problem.

One aspect of the present invention provides a business support system comprising:

a work time register that registers a work time; and a business use controller that refers to the work time register, starts business use of a communication device by a business application for supporting the business use of the communication device if a current time falls within the work time, and stops the business use of the communication device by the business application if the current time falls outside the work time.

Another aspect of the present invention provides a business support method comprising:

referring to a work time register that registers a work time and starting business use of a communication device by a business application for supporting the business use of the communication device if a current time falls within the work time; and stopping the business use of the communication device by the business application if the current time falls outside the work time.

Still other aspect of the present invention provides an information processing apparatus comprising:

a work time register that registers a work time; and a business use controller that refers to the work time register, starts support to a communication device by a business application for supporting business use of the communication device if a current time falls within the work time, and stops the support to the communication device by the business application if the current time falls outside the work time.

Yet other aspect of the present invention provides a control method of an information processing apparatus, comprising:

referring to a work time registered in a work time register, and starting support to a communication device by a business application for supporting business use of the communication device if a current time falls within the work time; and stopping the support to the communication device by the business application if the current time falls outside the work time.

Still other aspect of the present invention provides a control program of an information processing apparatus, which causes a computer to execute a method comprising:

referring to a work time registered in a work time register, and starting support to a communication device by a business application for supporting business use of the communication device if a current time falls within the work time; and stopping the support to the communication device by the business application if the current time falls outside the work time.

Yet other aspect of the present invention provides a communication device comprising:

a work time register that registers a work time; and a business use controller that refers to the work time register, activates a predetermined program and requests support from an information processing apparatus by a business application for supporting business use of the communication device if a current time falls within the work time, and stops the predetermined program and rejects the support from the information processing apparatus by the business application if the current time falls outside the work time.

Still other aspect of the present invention provides a control method of a communication device, comprising:

referring to a work time registered in a work time register, and activating a predetermined program and requesting support from an information processing apparatus by a business application for supporting business use of the communication device if a current time falls within the work time; and stopping the predetermined program and rejecting the support from the information processing apparatus by the business application if the current time falls outside the work time.

Yet other aspect of the present invention provides a control program of a communication device, which causes a computer to execute a method comprising:

referring to a work time registered in a work time register, and activating a predetermined program and requesting support from an information processing apparatus by a business application for supporting business use of the communication device if a current time falls within the work time; and stopping the predetermined program and rejecting the support from the information processing apparatus by the business application if the current time falls outside the work time.

According to the present invention, it is possible to control the business use of the communication device based on the work time without user's awareness.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A business support system 100 according to the first embodiment of the present invention will be described with reference to FIG. 1. The business support system 100 is a system that supports business use of a communication device.

Figure 1:
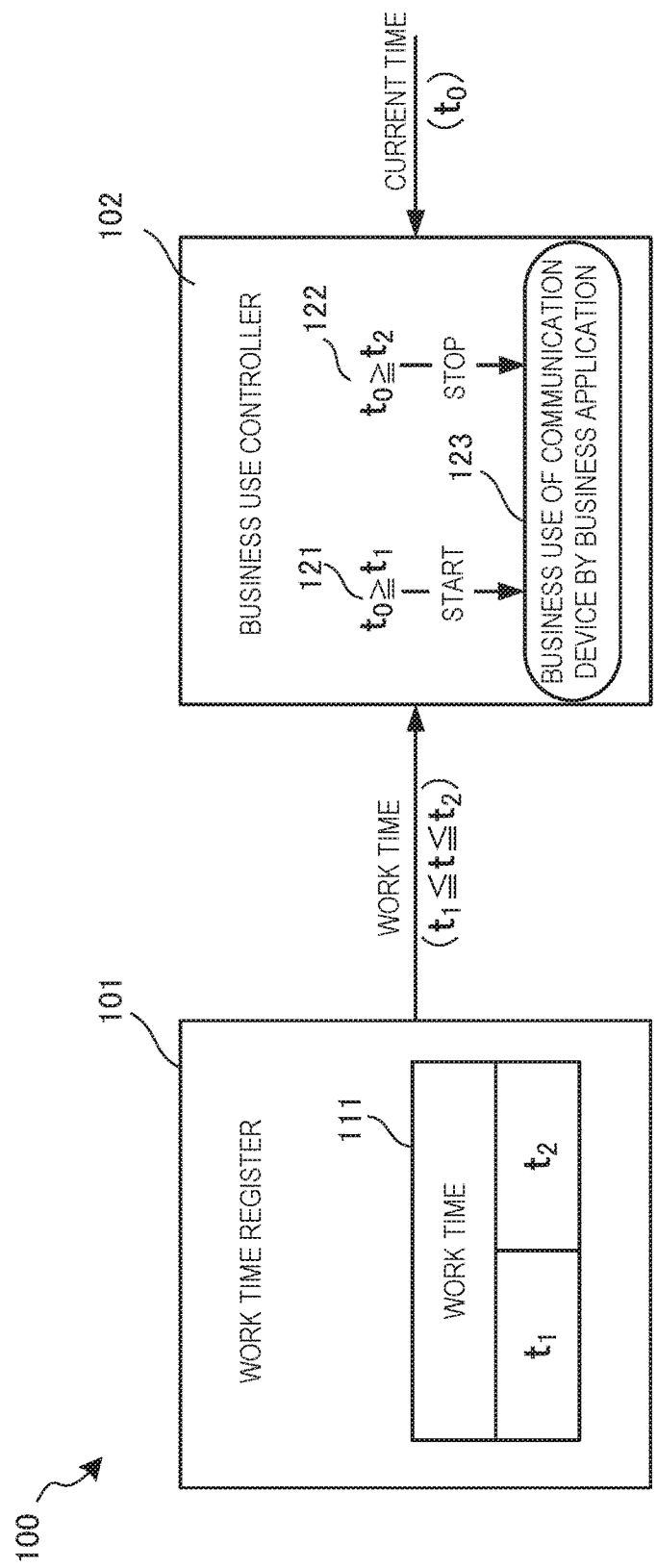
FIG. 1 is a block diagram showing the arrangement of a business support system according to the first embodiment of the present invention.

As shown in FIG. 1, the business support system 100 includes a work time register 101 and a business use controller 102. The work time register 101 registers a work time 111 (t: t1≤t≤t2). The business use controller 102 refers to the work time register 101. If the current time (t0) falls within the work time (121: t0≥t1), the business use controller 102 starts business use (123) of the communication device by a business application that supports the business use of the communication device. If the current time (t0) falls outside the work time (122: t0≥t2), the business use controller 102 stops the business use (123) of the communication device by the business application.

According to this embodiment, the business use of the communication device is automatically started and stopped depending on whether the current time falls within or outside the work time. Hence, it is possible to control the business use of the communication device based on the work time without user's awareness.

Second Embodiment

A business support system according to the second embodiment of the present invention will be described next. When using a private communication device for business purpose, the business support system according to this embodiment executes control of starting the business use if the current time falls within the work time and stops the business use if the current time falls outside the work time.

In this embodiment, as a business application used by the business support system to support business use of a communication device, an extension call application will be exemplified below. Hence, the service of the business application is provided cooperatively by a communication device and a server. However, the effects of this embodiment can be obtained even by an arrangement in which the communication device only obtains the right of access to the server and provides the service of the business application on its own or an arrangement in which the communication device is only connected to the server, and the server provides the service of the business application. In the extension call application, a predetermined program in the communication device is activated to start the business use of the communication device by the business application. The predetermined program in the communication device is stopped to stop the business use of the communication device by the business application.

Note that each of a work time setting unit, a work time registration database, a business use controller, and a control method setting unit provided in the business support system according to this embodiment can be included in either of the server that provides the business support and the communication device that receives the business support. The extension call application is merely an example of the business application that supports the business use of the communication device. Any other business application that supports the business use of the communication device can obtain the same effects as in this embodiment.

《Work Support System》

The arrangement and operation of a business support system 200 according to this embodiment will be described with reference to FIGS. 2 to 4B.

(Outline of Operation)

Figure 2:
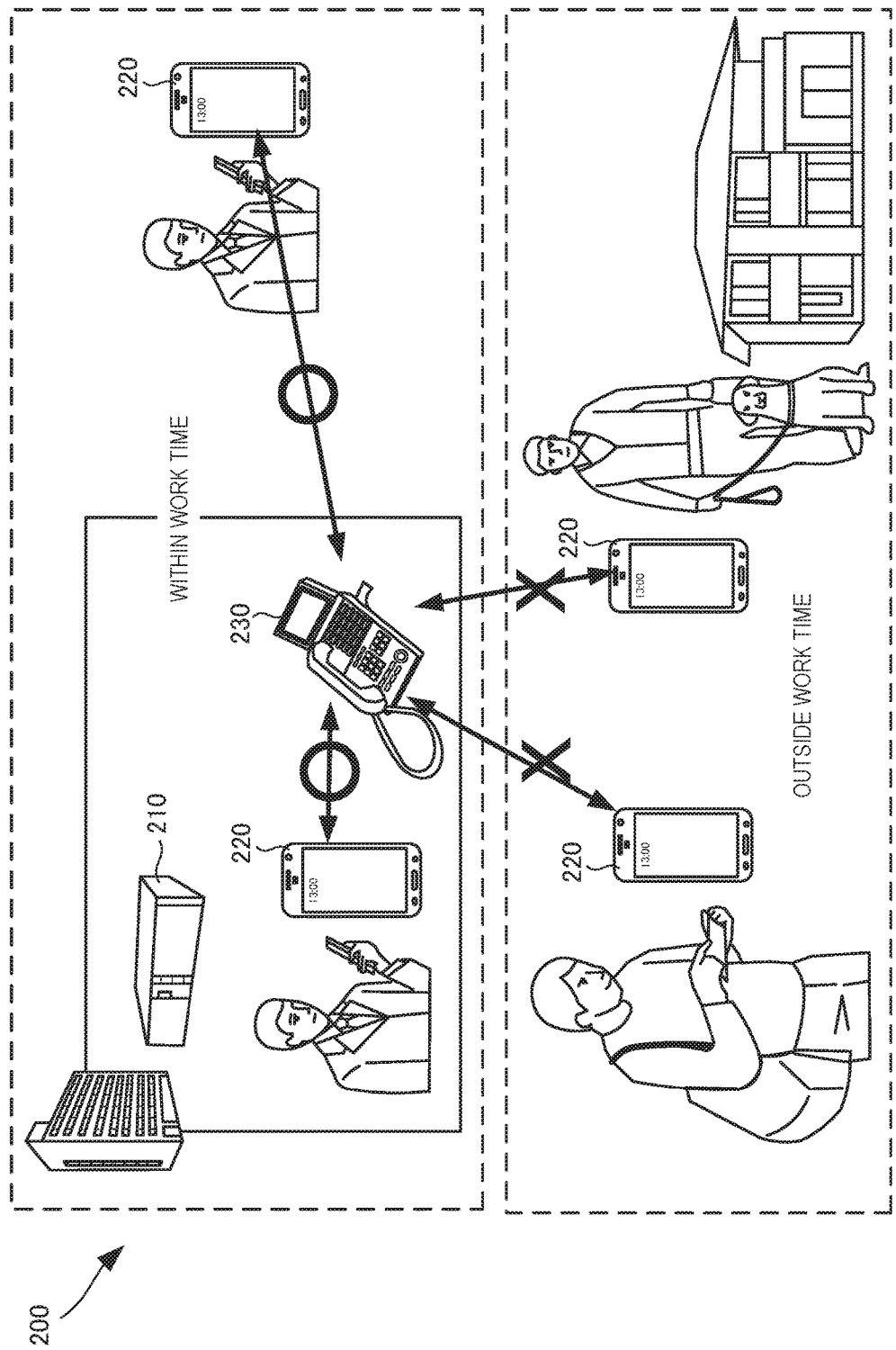
FIG. 2 is a view showing the outline of the operation of a business support system according to the second embodiment of the present invention.

FIG. 2 is a view showing the outline of the operation of the business support system 200 according to this embodiment.

FIG. 2 illustrates "within a work time" indicated by a broken line and "outside a work time" indicted by another broken line. Within the work time, a server 210 that provides the service of the extension call application and an in-house IP telephone 230 exist, and an extension call can always be made.

As for a smartphone 220 within the work time, the smartphone is used for business purpose irrespective of the location of the smartphone, that is, in or outside the office, the service of the extension call application is provided, and an extension call by the smartphone 220 is possible.

On the other hand, as for the smartphone 220 outside the work time, business use is stopped, the service of the extension call application is not provided, and an extension call by the smartphone 220 is impossible.

Note that the relationship between the work time and the business use of the smartphone 220 has been described with reference to FIG. 2 using the extension call application as an example of the business application. However, any other business application can obtain the same effects as described above.

(System Arrangement)

Figure 3:
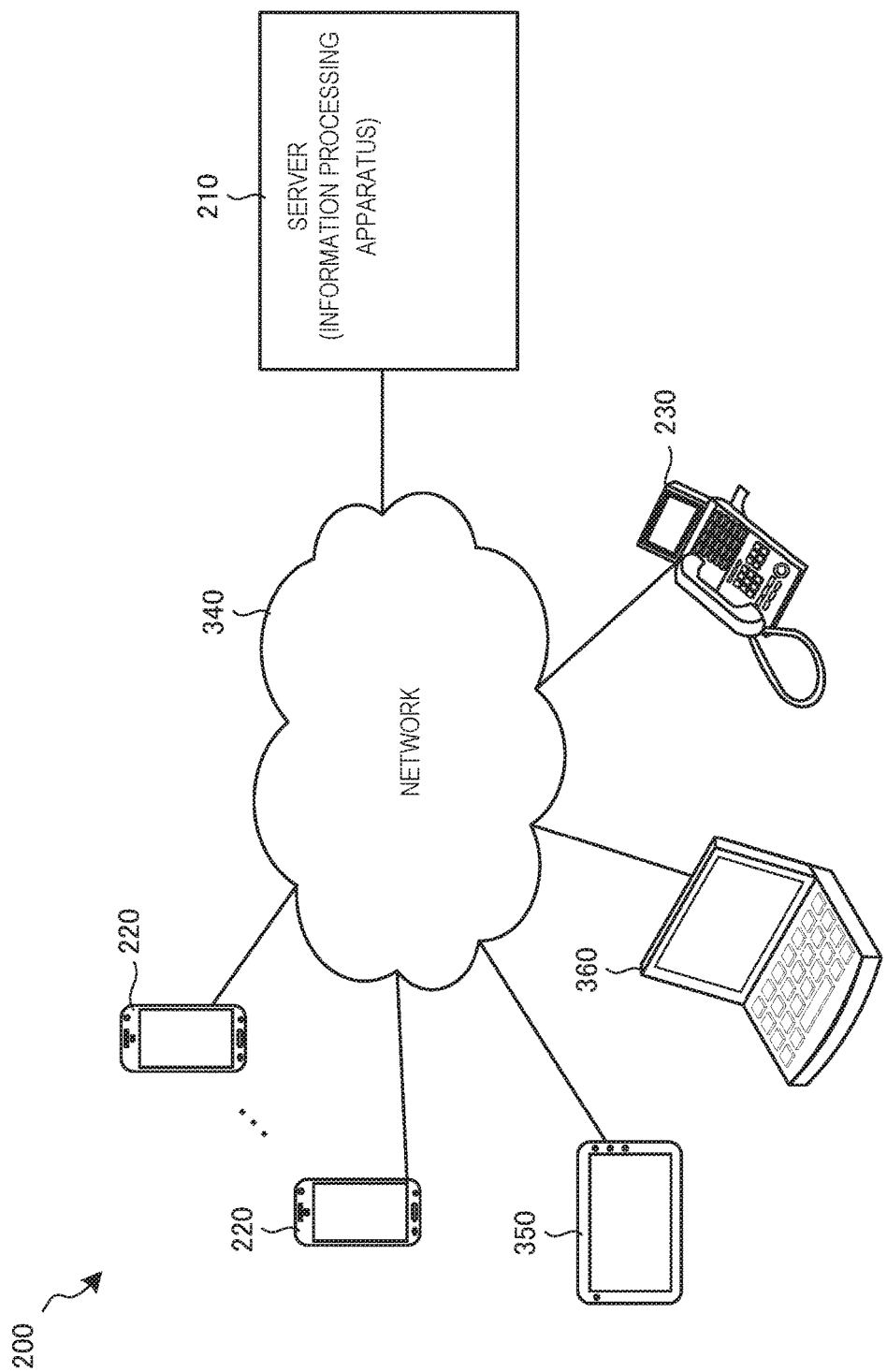
FIG. 3 is a block diagram showing the arrangement of the business support system according to the second embodiment of the present invention.

FIG. 3 is a block diagram showing the arrangement of the business support system 200 according to this embodiment. Note that the same reference numerals as in FIG. 2 denote the same constituent elements in FIG. 3.

The business support system 200 shown in FIG. 3 includes the server 210, the smartphone 220, a tablet 350, a notebook PC (Personal Computer) 360, and the in-house IP telephone 230 which are connected via a network 340. This embodiment will be explained using, as a representative, the extension call application that is a business application for implementing extension connection between the in-house IP telephone 230 and the smartphone 220, the tablet 350, the notebook PC 360, or the like by the server 210. Note that in the following embodiment, a description will be made using the smartphone 220 as a representative of a communication device. However, the effects of this embodiment can be obtained by the tablet 350 or the notebook PC 360 as well.

(Operation Sequence)

Figure 4A:
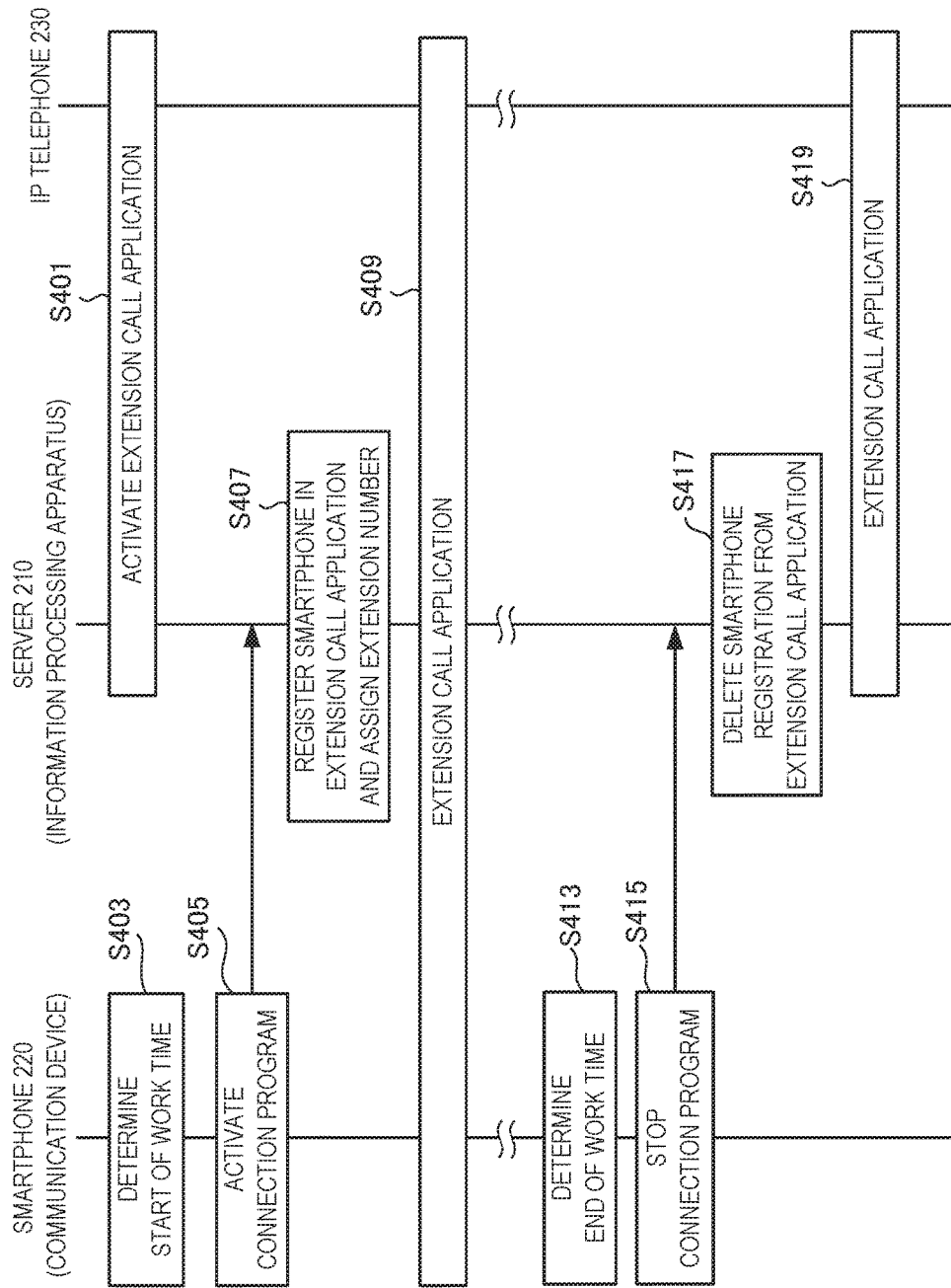
FIG. 4A is a sequence chart showing an operation procedure of the business support system according to the second embodiment of the present invention.

FIG. 4A is a sequence chart showing an operation procedure of the business support system 200 according to this embodiment. In the operation sequence of FIG. 4A, the smartphone 220 as a communication device determines the start or end of the work time and controls the business use of the smartphone 220 under the initiative of the smartphone 220.

On the server 210 and the in-house IP telephone 230, the service of the extension call application is provided (step S401). The smartphone 220 determines in step S403 whether the current time is the start of the work time. Upon determining that the current time is the start of the work time, in step S405, the smartphone 220 activates a connection program distributed to the smartphone 220 to receive the service of the extension call application. Note that the connection program is an access address to load the extension call application in the server 210.

In step S407, the server 210 registers the smartphone 220 in the extension call application, and assigns an extension number to the smartphone 220. After this processing, in step S409, the smartphone 220 can be connected to an internal communication system and originate/terminate a call to/from the IP telephone 230 as well by the service of the extension call application.

In step S413, the smartphone 220 determines whether the current time is the end of the work time. Upon determining that the current time is the end of the work time, in step S415, the smartphone 220 stops the connection program. In step S417, the server 210 deletes the registration of the smartphone 220 from the extension call application. After this processing, the smartphone 220 cannot receive the service of the extension call application and cannot originate/terminate a call to/from the IP telephone 230, as indicated by step S419.

Note that in FIG. 4A, processing of deleting the registration of the smartphone 220 from the extension call application is performed. However, in an extreme case of the initiative of the smartphone 220, the smartphone 220 may erase the assigned extension number or stop the program for an extension call to disable and rejecting an extension call.

Figure 4B:
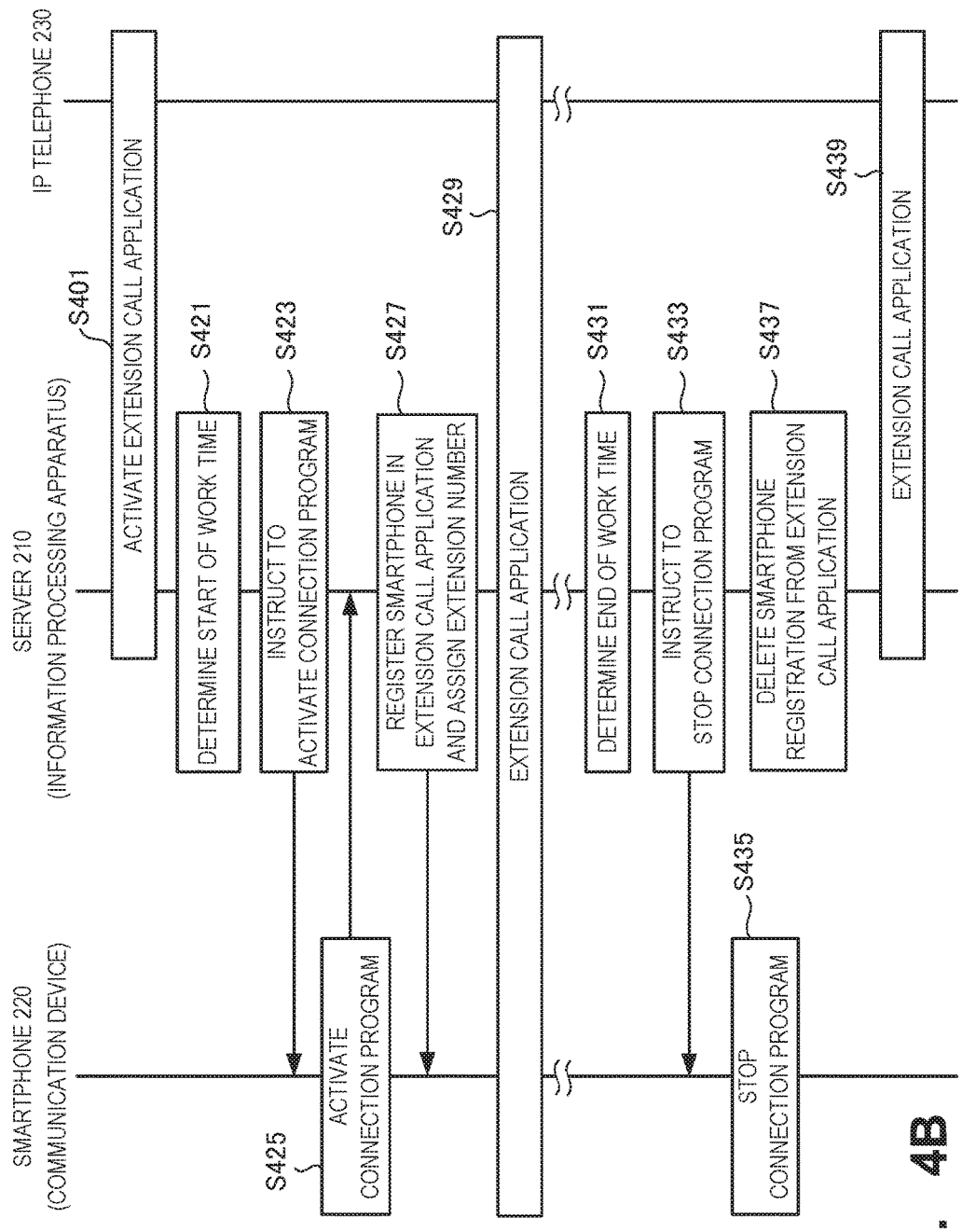
FIG. 4B is a sequence chart showing another operation procedure of the business support system according to the second embodiment of the present invention.

FIG. 4B is a sequence chart showing another operation procedure of the business support system 200 according to this embodiment. In the operation sequence of FIG. 4B, the server 210 as an information processing apparatus determines the start or end of the work time and controls the business use of the smartphone 220 under the initiative of the server 210. Note that the same step numbers as in FIG. 4A denote the same steps in FIG. 4B, and a description thereof will be omitted.

In step S421, the server 210 determines whether the current time is the start of the work time. Upon determining that the current time is the start of the work time, in step S423, the server 210 instructs the smartphone 220 to activate the connection program. In step S425, the smartphone 220 activates the connection program. Note that in FIG. 4B, the smartphone 220 is requested to activate the connection program. However, in an extreme case of the initiative of the server 210, the server 210 may limit the execution time of the extension call application in the work time to disable the business use of the communication device outside the work time.

In step S427, the server 210 registers the smartphone 220 in the extension call application, and assigns an extension number to the smartphone 220. After this processing, in step S429, the smartphone 220 can be connected to the internal communication system and originate/terminate a call to/from the IP telephone 230 as well by the service of the extension call application.

In step S431, the server 210 determines whether the current time is the end of the work time. Upon determining that the current time is the end of the work time, in step S433, the server 210 instructs the smartphone 220 to stop the connection program. In step S435, the smartphone 220 stops the connection program. In step S437, the server 210 deletes the registration of the smartphone 220 from the extension call application. After this processing, the smartphone 220 cannot receive the service of the extension call application and cannot originate/terminate a call to/from the IP telephone 230, as indicated by step S439.

Note that in FIG. 4B, the smartphone 220 is instructed to stop the program. However, in an extreme case of the initiative of the server 210, processing of deleting the registration of the smartphone 220 from the extension call application or erasing the registration of the extension number assigned to the smartphone 220 may be performed to disable the extension call of the smartphone 220.

Note that in FIGS. 4A and 4B, the processing functions are clearly separated to the server 210 or the smartphone 220. However, each the server 210 and the smartphone 220 may have some of the processing functions and cooperatively implement one function.

«Functional Arrangement of Server»

Figure 5:
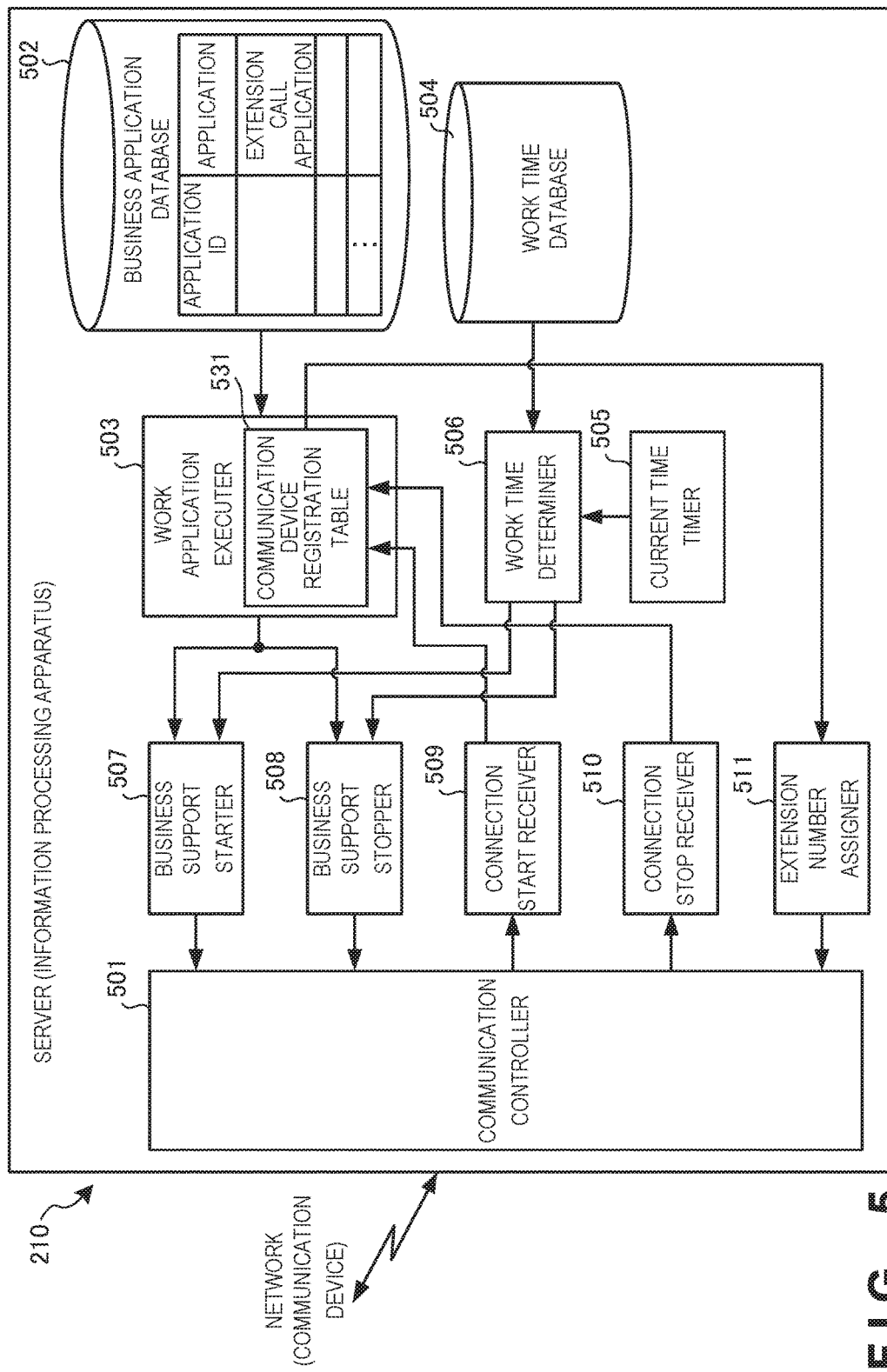
FIG. 5 is a block diagram showing the functional arrangement of a server serving as an information processing apparatus according to the second embodiment of the present invention.

FIG. 5 is a block diagram showing the functional arrangement of the server 210 serving as an information processing apparatus according to this embodiment. Note that the functional arrangement of the server 210 shown in FIG. 5 represents the function of implementing the control under the initiative of the server 210 corresponding to FIG. 4B. Hence, FIG. 5 illustrates even a functional component such as a work time database that is unnecessary in a case in which the business use of the smartphone 220 is controlled under the initiative of the smartphone 220, as shown in FIG. 4A, because the component need only be provided on the smartphone 220.

The server 210 includes a communication controller 501, a business application database 502, a business application executer 503, a work time database 504, a current time timer 505, and a work time determiner 506. The server 210 further includes a business support starter 507, a business support stopper 508, a connection start receiver 509, a connection stop receiver 510, and an extension number assigner 511.

The communication controller 501 controls communication with a communication device including the smartphone 220 via the network 340. The business application database 502 stores business applications provided by the server 210 in association with business application IDs. The business application executer 503 reads out a desired business application, in this example, an extension call application from the business application database 502 and executes it. Note that the business application executer 503 including a communication device registration table 531 registers a communication device to provide the service of the extension call application. Each smartphone 220 holds an extension number assigned to it.

The work time database 504 is a database configured to store a work time to provide the service of the business application in a case in which the server 210 manages the work time. Note that the work time can be set either uniformly or separately for each individual or position. The current time timer 505 is, for example, a timer that counts the current time. The work time determiner 506 determines whether the current time falls within the work time/whether the current time falls outside the work time by comparing the current time counted by the current time timer 505 with a corresponding work time from the work time database 504.

If the work time determiner 506 determines that the current time falls within the work time, the business support starter 507 starts business support to the smartphone 220, in this example, an extension call. On the other hand, if the work time determiner 506 determines that the current time falls outside the work time, the business support stopper 508 stops business support to the smartphone 220, in this example, an extension call.

The connection start receiver 509 receives a connection request from the smartphone 220 to the business application. The connection stop receiver 510 receives a stop request from the smartphone 220 to the business application. The extension number assigner 511 assigns an extension number to each smartphone 220 from the communication device registration table 531 in the business application executer 503.

«Functional Arrangement of Smartphone»

Figure 6:
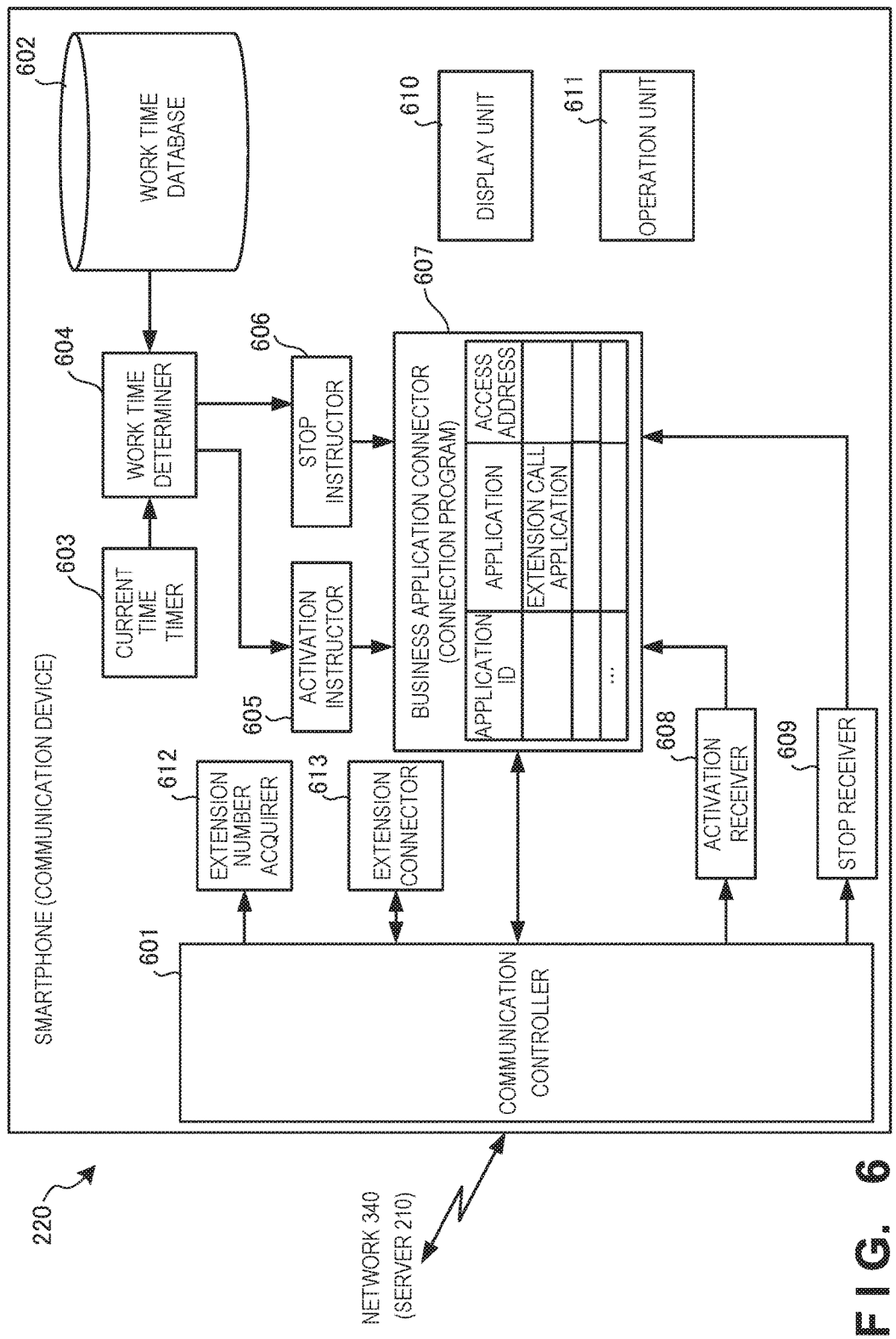
FIG. 6 is a block diagram showing the functional arrangement of a smartphone serving as a communication device according to the second embodiment of the present invention.

FIG. 6 is a block diagram showing the functional arrangement of the smartphone 220 serving as a communication device according to this embodiment. Note that the functional arrangement of the smartphone 220 shown in FIG. 6 represents the function of implementing the control under the initiative of the smartphone 220 corresponding to FIG. 4A. Hence, FIG. 6 illustrates even a functional component such as a work time database that is unnecessary in a case in which the business use of the smartphone 220 is controlled under the initiative of the server 210, as shown in FIG. 4B, because the component need only be provided on the server 210.

The smartphone 220 includes a communication controller 601, a work time database 602, a current time timer 603, a work time determiner 604, an activation instructor 605, a stop instructor 606, and a business application connector

607. The smartphone 220 further includes an activation receiver 608, a stop receiver 609, a display unit 610, an operation unit 611, an extension number acquirer 612, and an extension connector 613.

The communication controller 601 controls communication with the server 210 or the like via the network 340. The work time database 602 is a database configured to store a work time to provide the service of the business application in a case in which the smartphone 220 manages the work time. The current time timer 603 is, for example, a timer that counts the current time. The work time determiner 604 determines whether the current time falls within the work time/whether the current time falls outside the work time by comparing the current time counted by the current time timer 603 with a corresponding work time from the work time database 602. If the current time falls within the work time, the activation instructor 605 instructs to activate a program configured to receive the service of the business application. If the current time falls outside the work time, the stop instructor 606 instructs to stop the program configured to receive the service of the business application.

The business application connector 607 stores a business application whose service can be received by the smartphone 220 and an access address used to connect the business application. The business application connector 607 also stores a connection program to the business application, and executes the connection program to access the business application whose service can be received by the smartphone 220. The activation receiver 608 receives a connection program activation instruction under the initiative of the server 210. The stop receiver 609 receives a connection program stop instruction under the initiative of the server 210.

The extension number acquirer 612 acquires, from the server 210, an extension number used to receive the service of the extension call application of this example and holds the extension number. After the extension number is assigned, the extension connector 613 can make an extension call with, for example, the in-house IP telephone 230 or another smartphone 220 in business use by the extension number.

The display unit 610 displays an instruction to the user or the status of the apparatus or program. The operation unit 611 receives an operation from the user. Note that FIG. 6 does not illustrate a functional component such as a voice input/output unit indispensable for an extension call.

(Work Time Database and Communication Terminal Registration Table)

Figure 7:
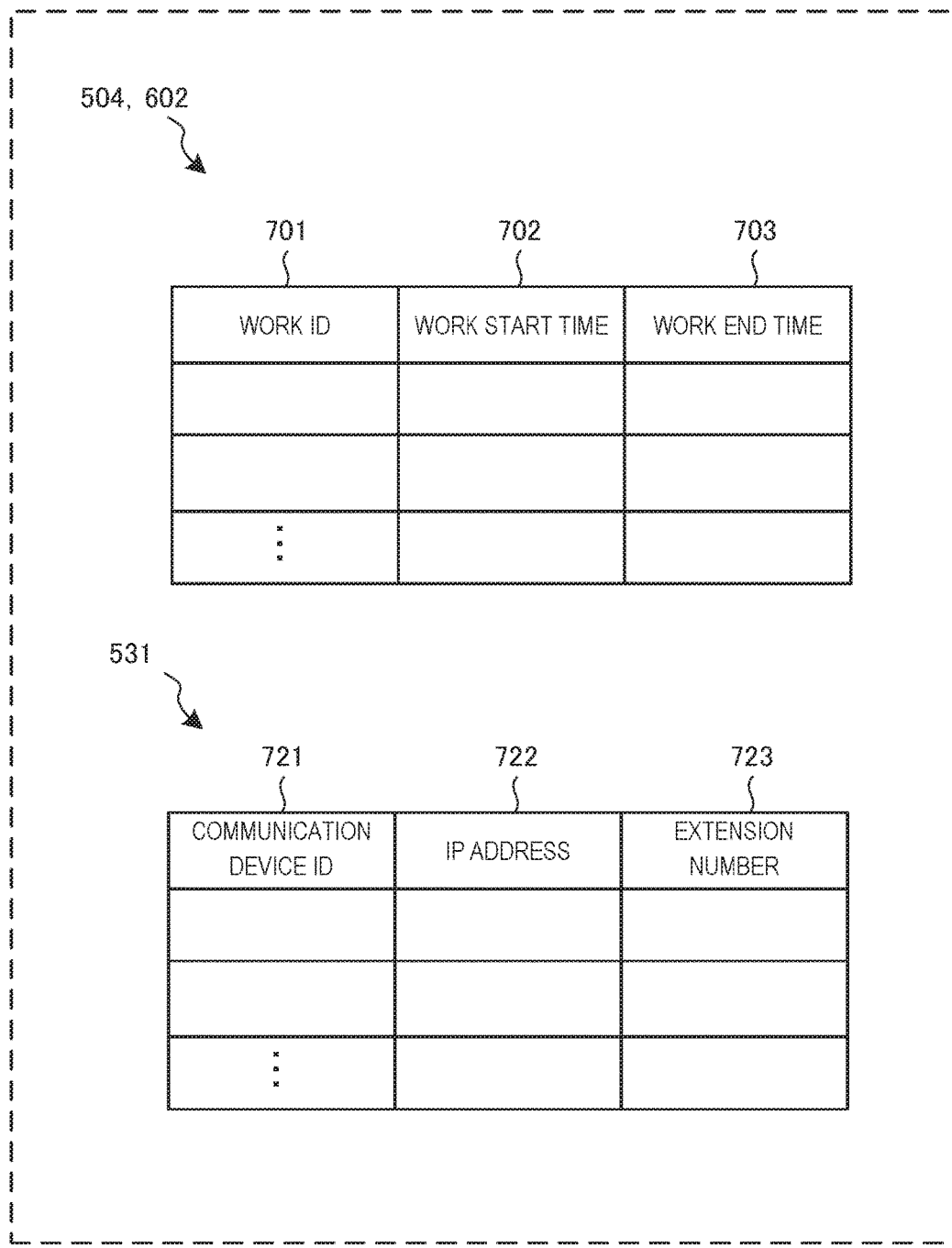
FIG. 7 is a view showing the arrangements of a work time database and a communication device registration table according to the second embodiment of the present invention.

FIG. 7 is a view showing the arrangements of the work time database 504 or 602 and the communication device registration table 531 according to this embodiment.

The work time database 504 or 602 is a database configured to store a work time to be compared with the current time. The work time database 504 or 602 stores a start of work time 702 and an end of work time 703 in association with a work ID 701 representing the type of a work. Note that in a company or the like, normally, a daily business hours is stored. However, in a case in which the business hours changes depending on the workplace or the business hours changes depending on the position, or in a shift working or discretionary working system, the work time is stored on an individual or group basis.

The communication device registration table 531 is a table that registers the smartphone 220 if it is used for business purpose by the business application, in this example, the extension call application. The communication device registration table 531 stores an IP address 722 and an assigned extension number 723 in association with a communication device ID 721 including the smartphone 220.

«Processing Procedure of Work Support System»

Figure 8:
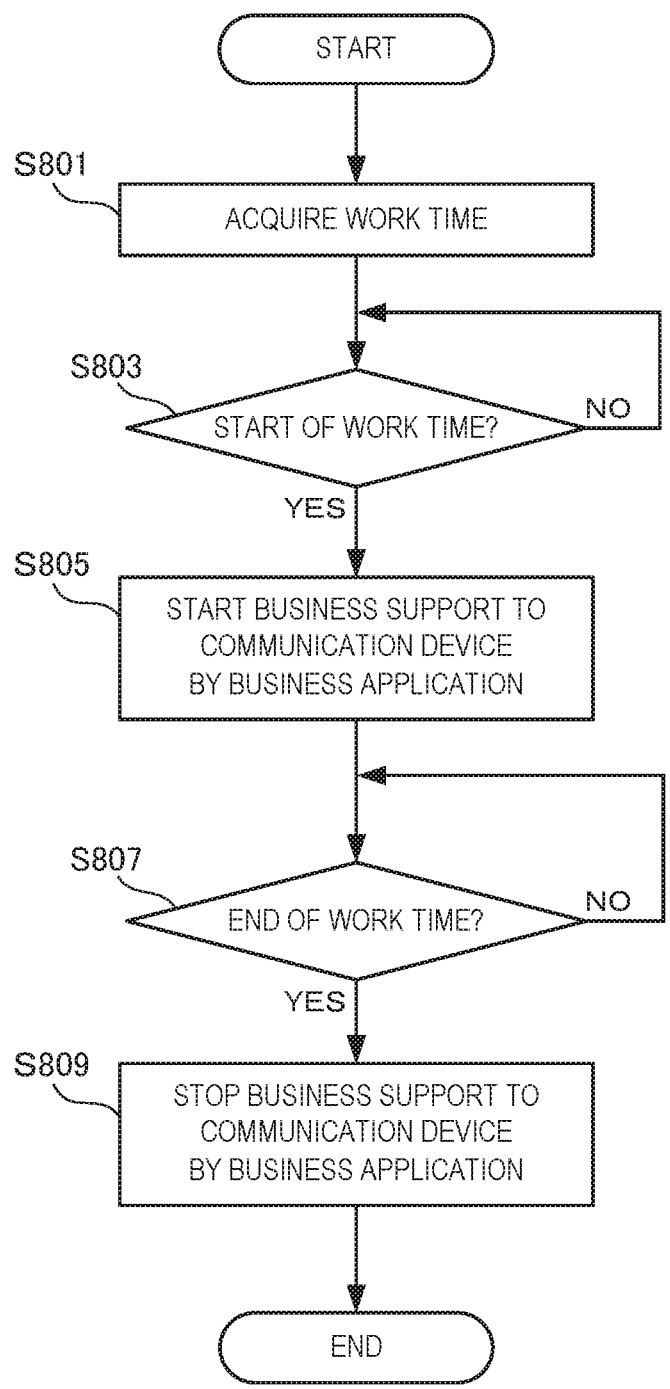
FIG. 8 is a flowchart showing the processing procedure of the business support system according to the second embodiment of the present invention.

FIG. 8 is a flowchart showing the processing procedure of the business support system 200 according to this embodiment.

In step S801, the business support system 200 acquires a work time to be managed in this system. In step S803, the business support system 200 determines whether the current time is the start of work time. If the current time is the start of work time, in step S805, the business support system 200 starts business support to the communication device by the business application.

In step S807, the business support system 200 determines whether the current time is the end of work time. If the current time is the end of work time, in step S809, the business support system 200 stops business support to the communication device by the business application.

«Processing Procedure of Smartphone and Server»

Figure 9A:
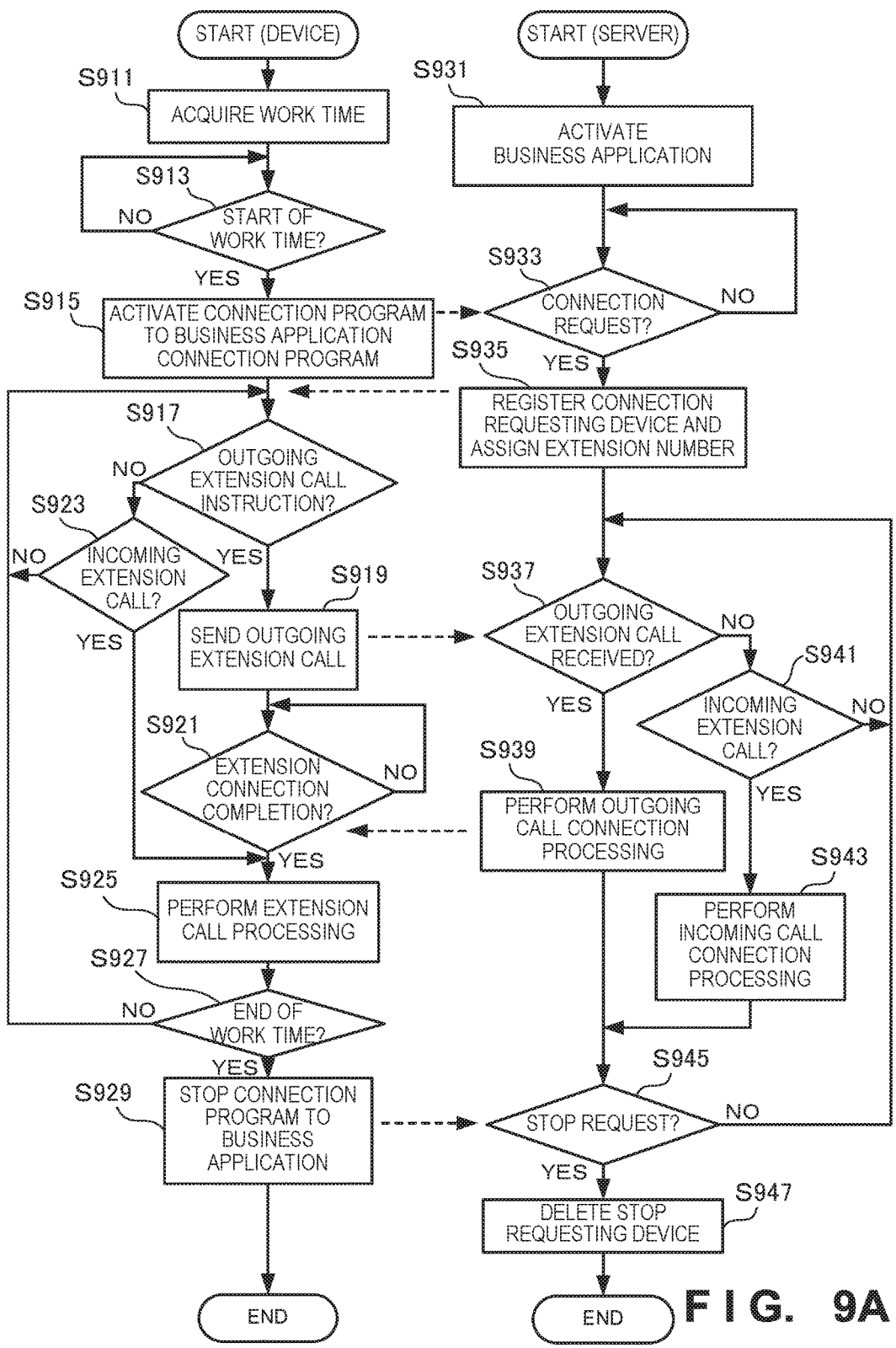
FIG. 9A is a flowchart showing a processing procedure of the smartphone and the server in the business support system according to the second embodiment of the present invention.

FIG. 9A is a flowchart showing a processing procedure of the smartphone 220 and the server 210 in the business support system 200 according to this embodiment. This flowchart is executed by the CPUs (Central Processing Units) of the smartphone 220 and the server 210 using memories to implement the functional components shown in FIGS. 5 and 6. Note that FIG. 9A shows a case in which the business use of the smartphone 220 is controlled by the work time under the initiative of the smartphone 220 in correspondence with FIG. 4A.

(Processing of Work Start Time)

In step S911, the smartphone 220 acquires a corresponding work time from the work time database 602. In step S913, the smartphone 220 determines whether the current time is the start of work time. If the current time is the start of work time, in step S915, the smartphone 220 activates the connection program to the business application and performs connection (registration) to the server 210.

The server 210 activates the business application that provides the service in step S931, and waits for a connection request from the smartphone 220 in step S933. Upon receiving a connection request from the smartphone 220, in step S935, the server 210 registers the smartphone 220 that has requested the connection, and assigns an extension number. The smartphone 220 receives and holds the extension number.

(Outgoing Extension Call)

In step S917, the smartphone 220 waits for an outgoing extension call by the user. If there is an outgoing extension call by the user, in step S919, the smartphone 220 sends the outgoing extension call by the assigned extension number to the server 210.

In step S937, the server waits for an outgoing extension call from the smartphone 220. If there is an outgoing extension call, in step S939, the server performs connection processing with another communication device having the called extension number.

In step S921, the smartphone 220 waits for completion of extension connection. If extension connection is completed, in step S925, the smartphone 220 executes extension call processing with the called communication device.

Note that in this example, an example in which the server 210 performs extension connection processing has been described. However, an outgoing call to another server that performs extension processing or an outgoing call and an extension call by the extension number between communication devices without intervention of a server may be implemented.

(Incoming Extension Call)

In step S923, the smartphone 220 waits for an incoming extension call from the server 210. In step S941, the server 210 waits for an incoming extension call from another communication device to the smartphone 220. If there is an incoming extension call, in step S943, the server 210 sends the incoming extension call to the smartphone 220. Upon receiving the incoming extension call, the smartphone 220 executes predetermined incoming call processing in accordance with off-hook by the user. In step S925, the smartphone 220 performs connection processing with the calling communication device.

Note that as in outgoing call processing, an incoming call from to another server that performs extension processing or an incoming call and an extension call by the extension number between communication devices without intervention of a server may be implemented.

(Processing of Work End Time)

In step S927, the smartphone 220 determines whether the current time is the end of work time. The processes of steps S917 to S927 are repeated until the current time reaches the end of work time. If the current time is the end of work time, in step S929, the smartphone 220 stops the connection program to the extension call application that is the business application.

In step S945, the server 210 waits for a business application stop request from the smartphone 220. Upon receiving a business application stop request, in step S947, the server 210 deletes the registration of the device that has requested the stop.

Figure 9B:
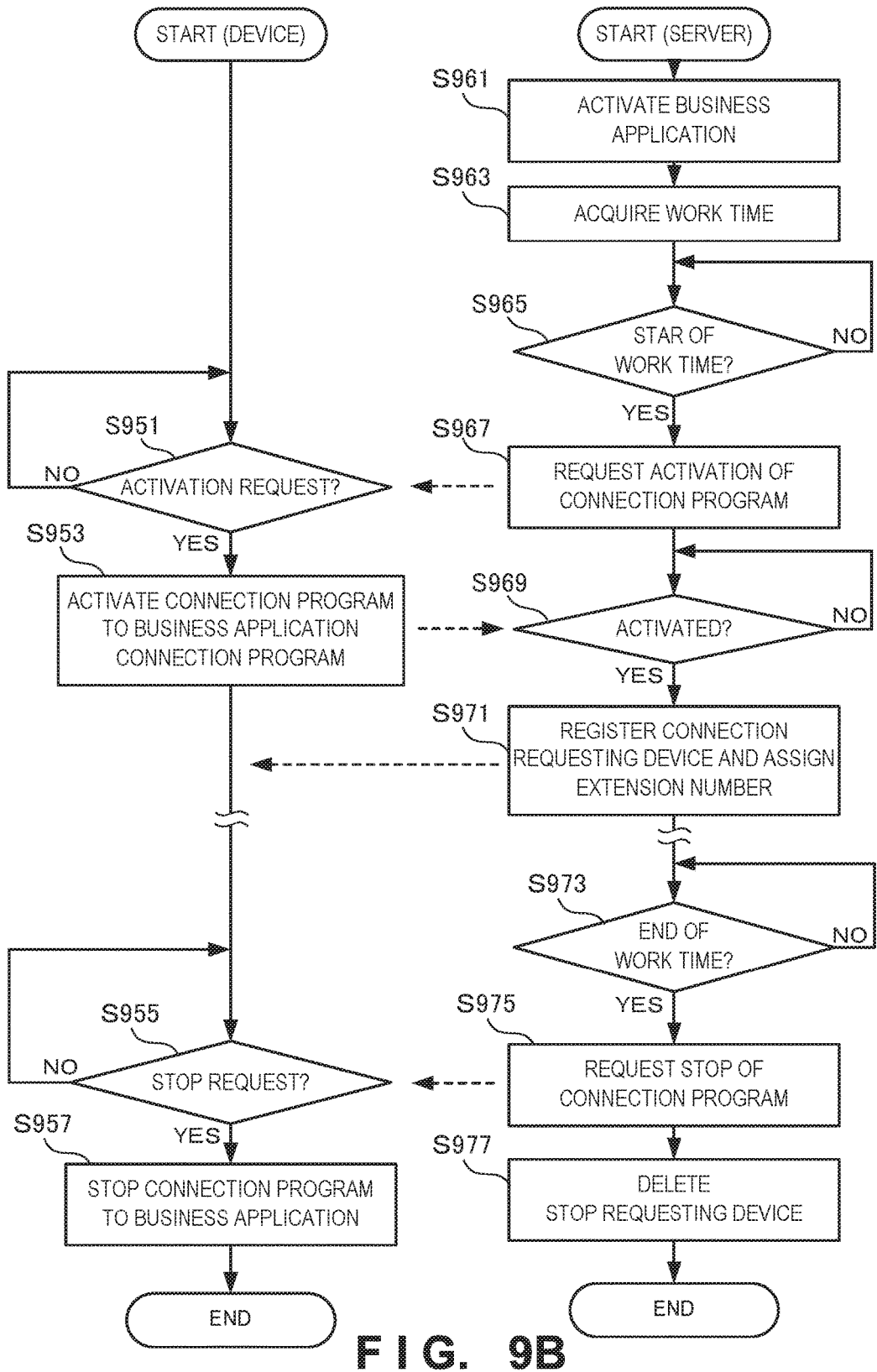
FIG. 9B is a flowchart showing another processing procedure of the smartphone and the server in the business support system according to the second embodiment of the present invention.

FIG. 9B is a flowchart showing another processing procedure of the smartphone 220 and the server 210 in the business support system 200 according to this embodiment. This flowchart is executed by the CPUs of the smartphone 220 and the server 210 using memories to implement the functional components shown in FIGS. 5 and 6. Note that FIG. 9B shows a case in which the business use of the smartphone 220 is controlled by the work time under the initiative of the server 210 in correspondence with FIG. 4B.

(Processing of Work Start Time)

In step S961, the server 210 activates a corresponding business application in the business application database 502. In step S963, the server 210 acquires a corresponding work time from the work time database 504. In step S965, the server 210 determines whether the current time is the start of work time. If the current time is the start of work time, in step S967, the server 210 performs broadcasting to activate the connection program in the smartphone 220. In step S951, the smartphone 220 waits for a connection program activation request from the server 210. Upon receiving the activation request, in step S953, the smartphone 220 activates the connection program to the business application.

In step S969, the server 210 waits for activation of the connection program in the smartphone 220. Upon receiving activation, in step S971, the server 210 registers the smartphone 220 that has requested the connection, and assigns an extension number. Note that as shown in FIG. 4B, the server 210 may simply limit the execution time of the extension call application in the work time to disable the business use of the communication device outside the work time.

The procedures of (outgoing extension call) and (incoming extension call) are the same as in FIG. 9A, and a repetitive description thereof will be omitted.

(Processing of Work End Time)

In step S973, the server 210 determines whether the current time is the end of work time. If the current time is the end of work time, in step S975, the server 210 requests the smartphone 220 to stop the connection program. In step S955, the smartphone 220 waits for a connection program stop request from the server 210. Upon receiving a stop request, in step S957, the smartphone 220 stops the connection program to the business application. On the other hand, in step S977, the server 210 deletes the registration of the communication device requested to stop. Note that as shown in FIG. 4B, processing of deleting the registration of the smartphone 220 from the extension call application may simply be performed, or the registration of the extension number assigned to the smartphone 220 may be erased to disable the extension call of the smartphone 220.

According to this embodiment, in the extension call application that is one of business applications and allows the user to use a communication device as an extension in the work time, the business use of the communication device is automatically started and stopped depending on whether the current time falls within or outside the work time. Hence, it is possible to control the business use of the communication device based on the work time without user's awareness.

Third Embodiment

A business support system according to the third embodiment of the present invention will be described next. The business support system according to this embodiment is different from the second embodiment in that post-processing after the stop of service providing by a business application, for example, in a case in which the business use of a communication device by an extension call application stops is performed. For example, processes such as transfer to a main number, switching to a voice message, and saving of an incoming call history are started. The rest of components and operations is the same as in the second embodiment. Hence, the same reference numerals denote the same components and operations, and a detailed description thereof will be omitted.

«Display Screen of Smartphone»

Figure 10:
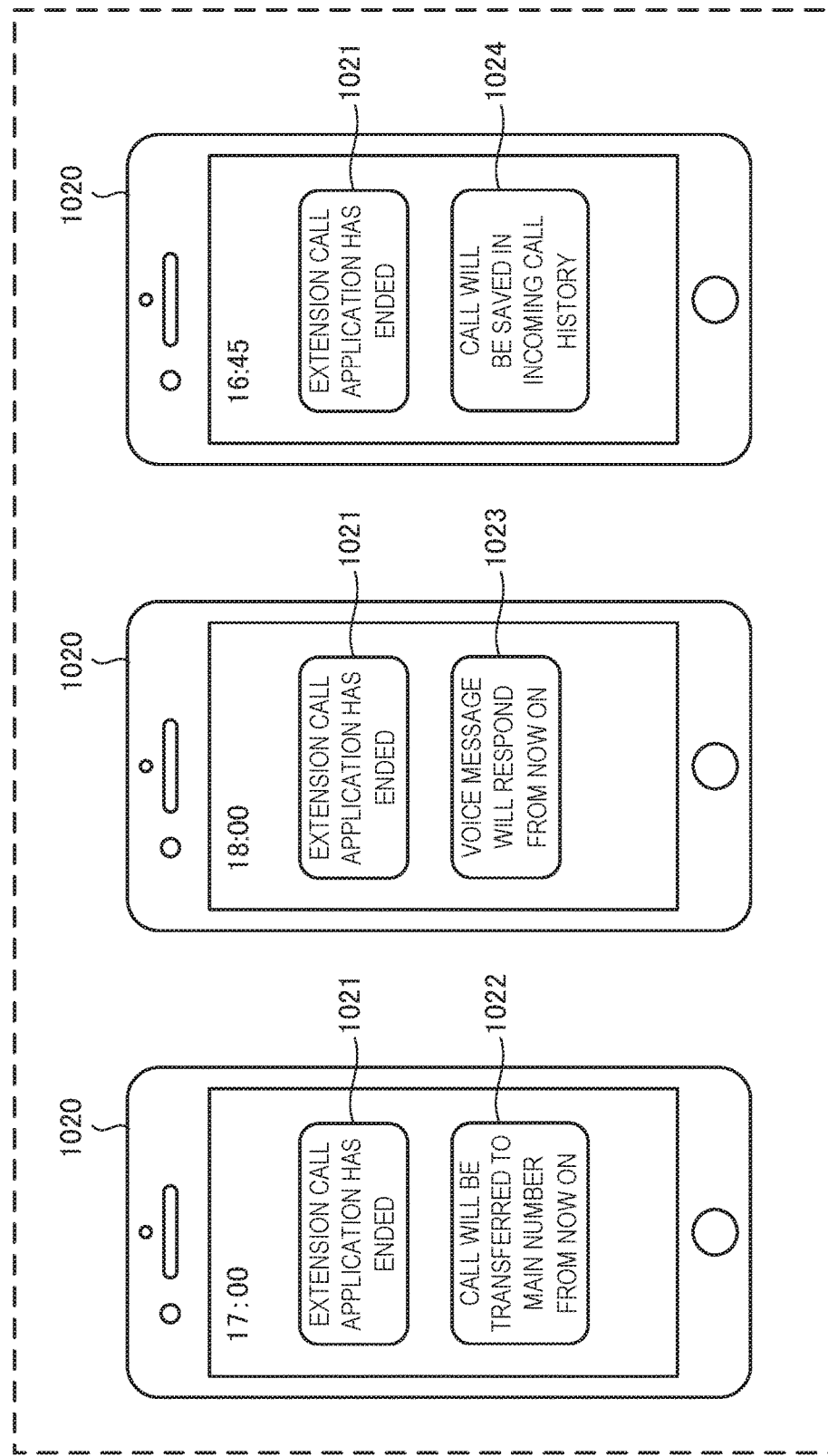
FIG. 10 is a view showing display screens of a smartphone serving as a communication device by the operation of a business support system according to the third embodiment of the present invention.

FIG. 10 is a view showing display screens of a smartphone 1020 serving as a communication device by the operation of a business support system 200 according to this embodiment.

In the left view of FIG. 10, the smartphone 1020 is released from business use, and a message 1021 "extension call application has ended" is displayed. Together with the message 1021, a message 1022 "call will be transferred to main number from now on" notifies that after the release from the business use, an incoming extension call to the smartphone 1020 will be transferred to the main number.

In the middle view of FIG. 10, when the smartphone 1020 is released from business use, together with the message 1021 "extension call application has ended", a message 1023 "voice message will respond from now on" notifies that after the release, a voice message will respond to an incoming extension call to the smartphone 1020.

In the right view of FIG. 10, when the smartphone 1020 is released from business use, together with the message 1021 "extension call application has ended", a message 1024 "call will be saved in incoming call history" notifies that after the release from business use, an incoming extension call to the smartphone 1020 will be saved in the server as an incoming call history.

Note that FIG. 10 shows examples of processing after the smartphone 1020 is released from business use, and the processing is not limited to these. In this embodiment, shift to any processing is possible as long as it aims at smooth processing shift after the release from business use, instead of cutting off processing according to the release from business use, as the second embodiment.

«Operation Procedure of Work Support System»

Figure 11:
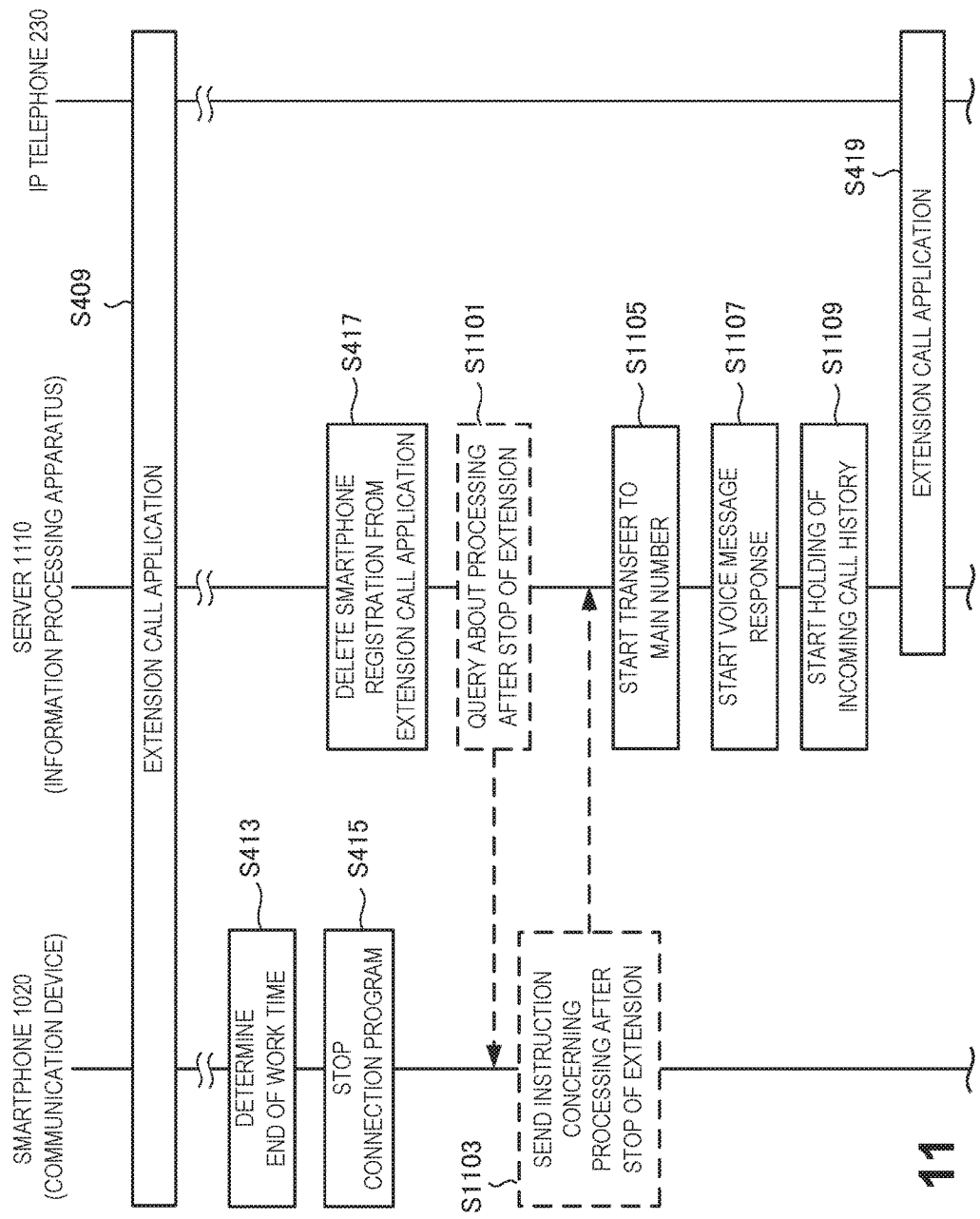
FIG. 11 is a sequence chart showing the operation procedure of the business support system according to the third embodiment of the present invention.

FIG. 11 is a sequence chart showing the operation procedure of the business support system 200 according to this embodiment. Note that the same step numbers as in FIG. 4A denote the same steps in FIG. 11, and a description thereof will be omitted.

In step S1101, a server 1110 queries the smartphone 1020 about processing after the stop of the extension call service. In step S1103, the smartphone 1020 sends an instruction to the server 1110 concerning processing after the stop of the extension call service. Note that steps S1101 and S1103 are options. In this embodiment, processing after the stop of the extension call service is assumed to be permanently set.

The server 1110 shifts to processing preset or selected in steps S1101 and S1103. That is, if the processing is transfer to the main number, the server 1110 starts transfer processing to the main number in step S1105. If the processing is voice message response, the server 1110 starts voice message response processing in step S1107. If the processing is holding of an incoming call history, the server 1110 starts incoming call history holding processing in step S1109.

Note that in this embodiment, only a case in which the smartphone 1020 determines whether the current time falls within or outside the work time is shown. However, even in a case in which the server makes the determination, processing after the stop of the extension call service is the same as described above.

«Processing Procedure of Server»

Figure 12:
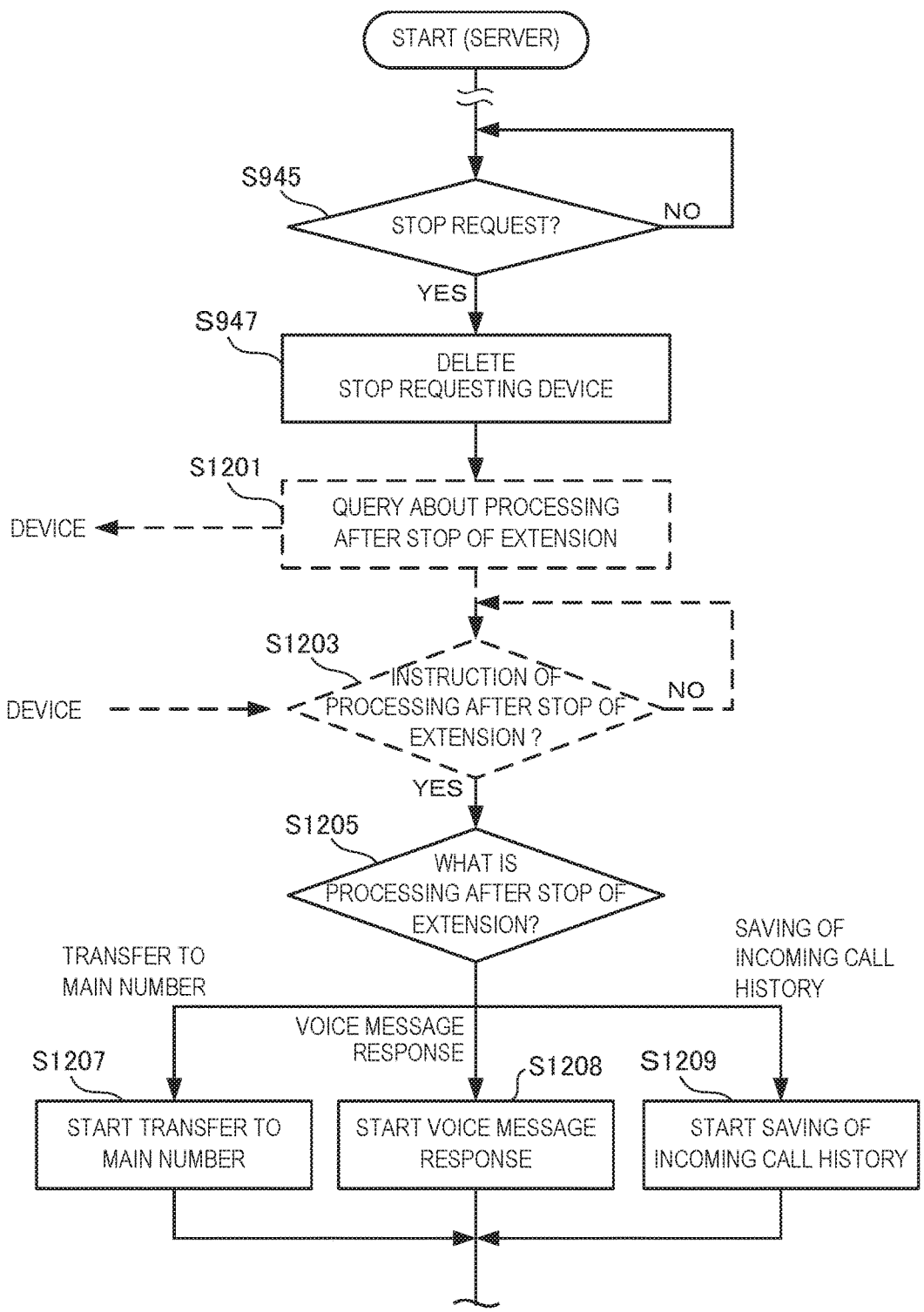
FIG. 12 is a flowchart showing the processing procedure of a server in the business support system according to the third embodiment of the present invention.

FIG. 12 is a flowchart showing the processing procedure of the server 1110 in the business support system 200 according to this embodiment. This flowchart is executed by the CPU of the server 1110 using memories to implement the functions of the server 1110. Note that the same step numbers as in FIG. 9A denote the same steps in FIG. 12, and a repetitive description thereof will be omitted.

In step S1201, the server 1110 queries the smartphone 1020 about processing after the stop of the extension call service. In step S1203, the server 1110 waits for an instruction of processing after the stop of extension call service from the smartphone 1020. Note that steps S1201 and S1203 are options, as described with reference to FIG. 11.

In step S1205, the server 1110 determines what is processing to shift after the stop of the extension call service, which is preset or selected in steps S1201 and S1203. If the processing to shift after the stop of the extension call service is transfer to the main number, the server 1110 starts transfer processing to the main number in step S1207. If the processing is voice message response, the server 1110 starts voice message response processing in step S1208. If the processing is holding of an incoming call history, the server 1110 starts incoming call history holding processing in step S1209.

According to this embodiment, in the extension call application that is one of business applications and allows the user to use a communication device as an extension in the work time, post-processing in a case in which the business use of the communication device is stopped at the time of stop of the work time is performed. It is therefore possible to perform smooth work shift without interference with the work.

Fourth Embodiment

A business support system according to the fourth embodiment of the present invention will be described next. The business support system according to this embodiment is different from the second and third embodiments in that the business support system avoids the forcible start and stop of business use of a communication device independently of a user and queries about various kinds of processing shifts of the user, or determines whether to approve the processing shift by the user on the server side. The rest of components and operations is the same as in the second embodiment. Hence, the same reference numerals denote the same components and operations, and a detailed description thereof will be omitted.

In this embodiment, a query unit queries whether to execute the start and stop of business use of the communication device by a business application, and an approver accepts approval of execution for the query of the query unit. There are a case in which the communication device is queried about a processing shift by the server and a case in which it is determined whether to approve a processing shift from the communication device on the server side.

In the former case, the query unit is included in the server, the communication device is queried about the start of the business use of the communication device by the business application and the stop of the business use of the communication device by the business application, and the approver is included in the communication device. On the other hand, in the latter case, the query unit is included in the communication device, the server is queried about the start of the business use of the communication device by the business application outside the work time, the stop of the business use of the communication device by the business application within the work time, and change of the work time, and the approver is included in the server.

«Work Support System»

The arrangement and operation of a business support system 200 according to this embodiment will be described with reference to FIGS. 13A to 14B.

(Display Screen of Smartphone)

Figure 13A:
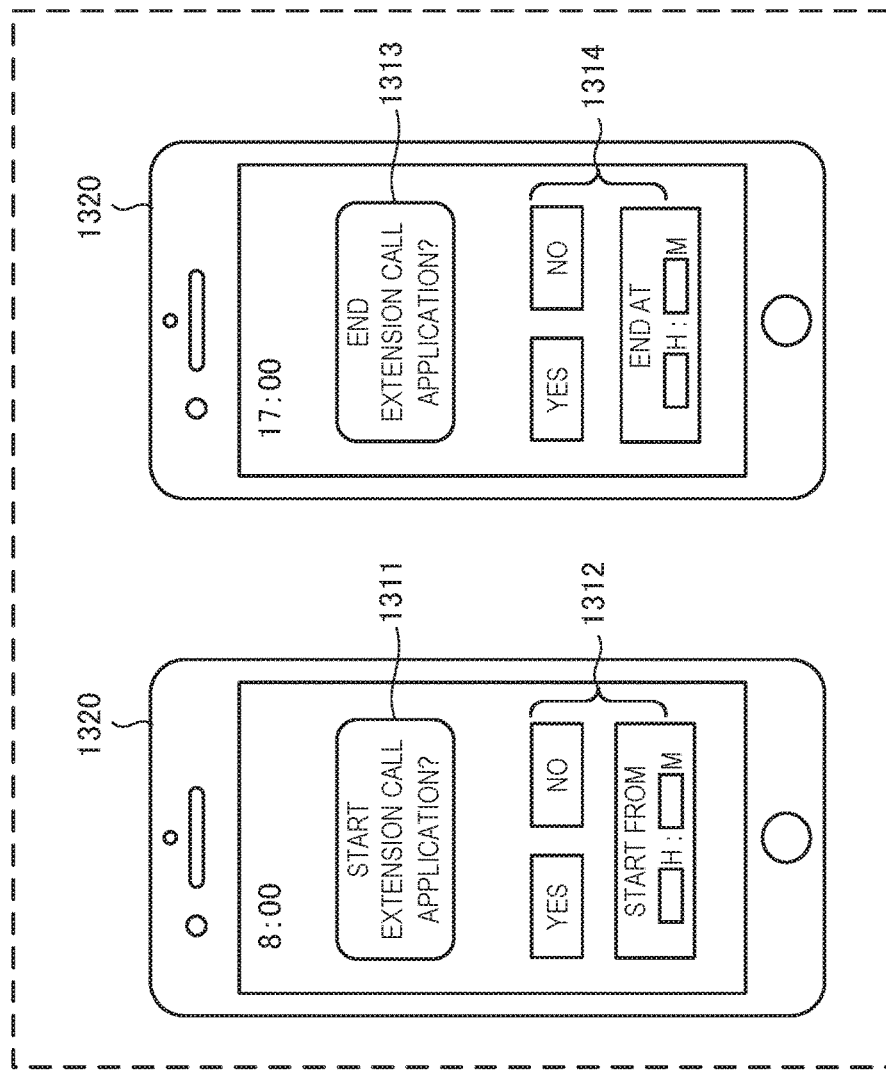
FIG. 13A is a view showing display screens of a smartphone by the operation of a business support system according to the fourth embodiment of the present invention.

FIG. 13A is a view showing display screens of a smartphone 1320 by the operation of the business support system 200 according to this embodiment. FIG. 13A shows display screens in a case in which the smartphone 1320 can respond to a query about the start or stop, instead of automatically executing the start or stop of an extension call application.

In the left view of FIG. 13A, if the current time is the start of work time, and the condition to start the extension call application is met, the smartphone 1320 displays a message 1311 "start extension call application?". As for the response of the user, input buttons and designation frame 1312 to input "YES", "NO", and "start from □H:□M" representing that the extension call application should start not now but later are presented.

In the right view of FIG. 13A, if the current time is the end of work time, and the condition to stop the extension call application is met, the smartphone 1320 displays a message 1313 "end extension call application?". As for the response of the user, input buttons and designation frame 1314 to input "YES", "NO", and "end at □H:□M" representing that the extension call application should stop not now but later are presented.

Figure 13B:
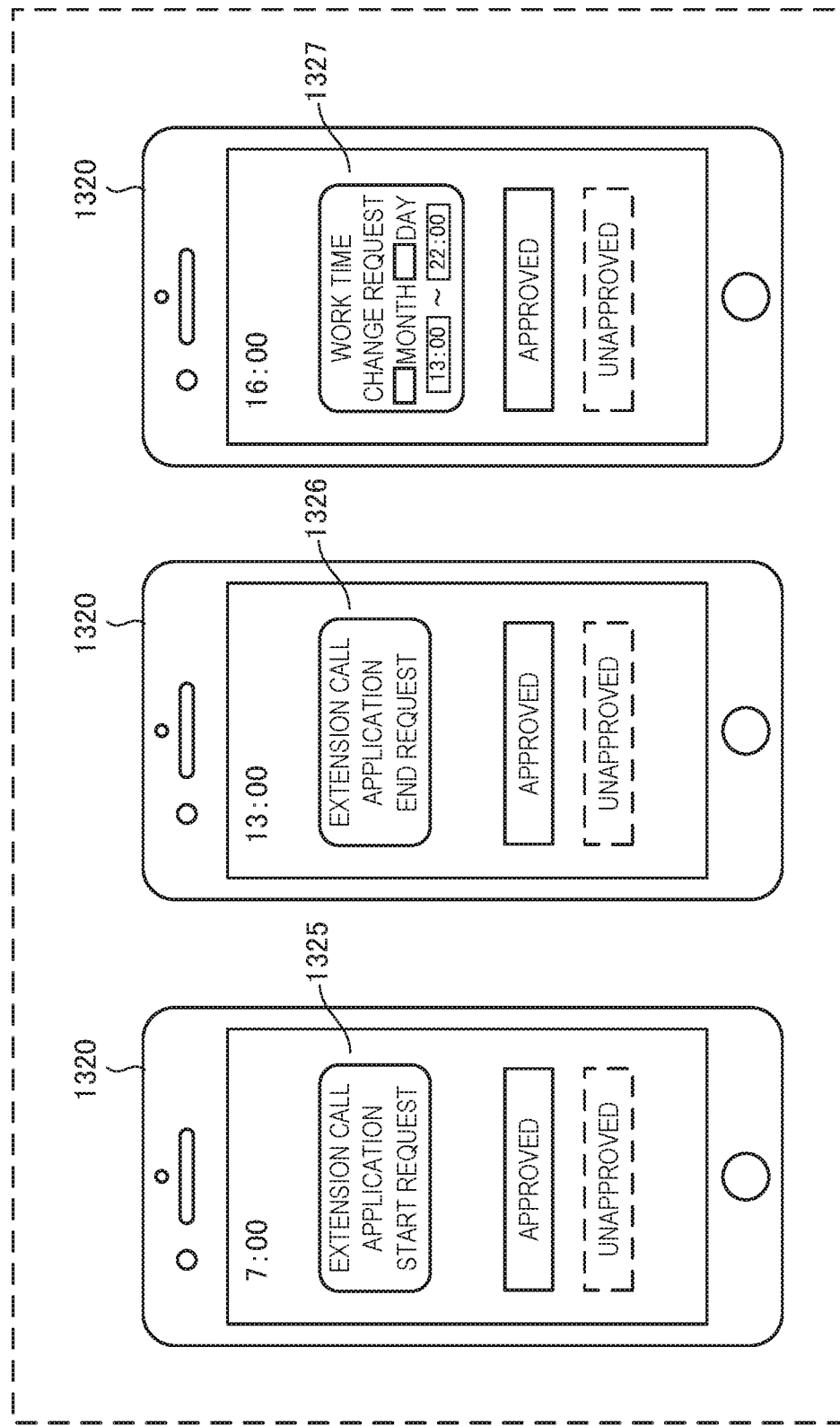
FIG. 13B is a view showing other display screens of the smartphone by the operation of the business support system according to the fourth embodiment of the present invention.

FIG. 13B is a view showing other display screens of the smartphone 1320 by the operation of the business support system 200 according to this embodiment. FIG. 13B shows approval screens in a case in which from the smartphone 1320, the user requests the server to start or stop the extension call application or change the work time.

The left view of FIG. 13B shows a display screen 1325 of the smartphone 1320, which requests the start of the extension call application in a case in which the current time falls outside the work time. If the user requests the start of the extension call application outside the work time, the server checks the request. If the request is approved, a result "approved" is notified. If the request is not approved, a result "unapproved" is notified.

The middle view of FIG. 13B shows a display screen 1326 of the smartphone 1320, which requests the stop of the extension call application in a case in which the current time falls within the work time, and the smartphone is receiving the service of the extension call application. If the user requests the stop of the extension call application in within the work time, the server checks the request. If the request is approved, a result "approved" is notified. If the request is not approved, a result "unapproved" is notified.

The right view of FIG. 13B shows a display screen 1327 of the smartphone 1320, which requests a change of the work time if the user wants the change. If the user requests the change of the work time, the server checks the request. If the request is approved, a result "approved" is notified. If the request is not approved, a result "unapproved" is notified.

(Operation Procedure)

Figure 14A:
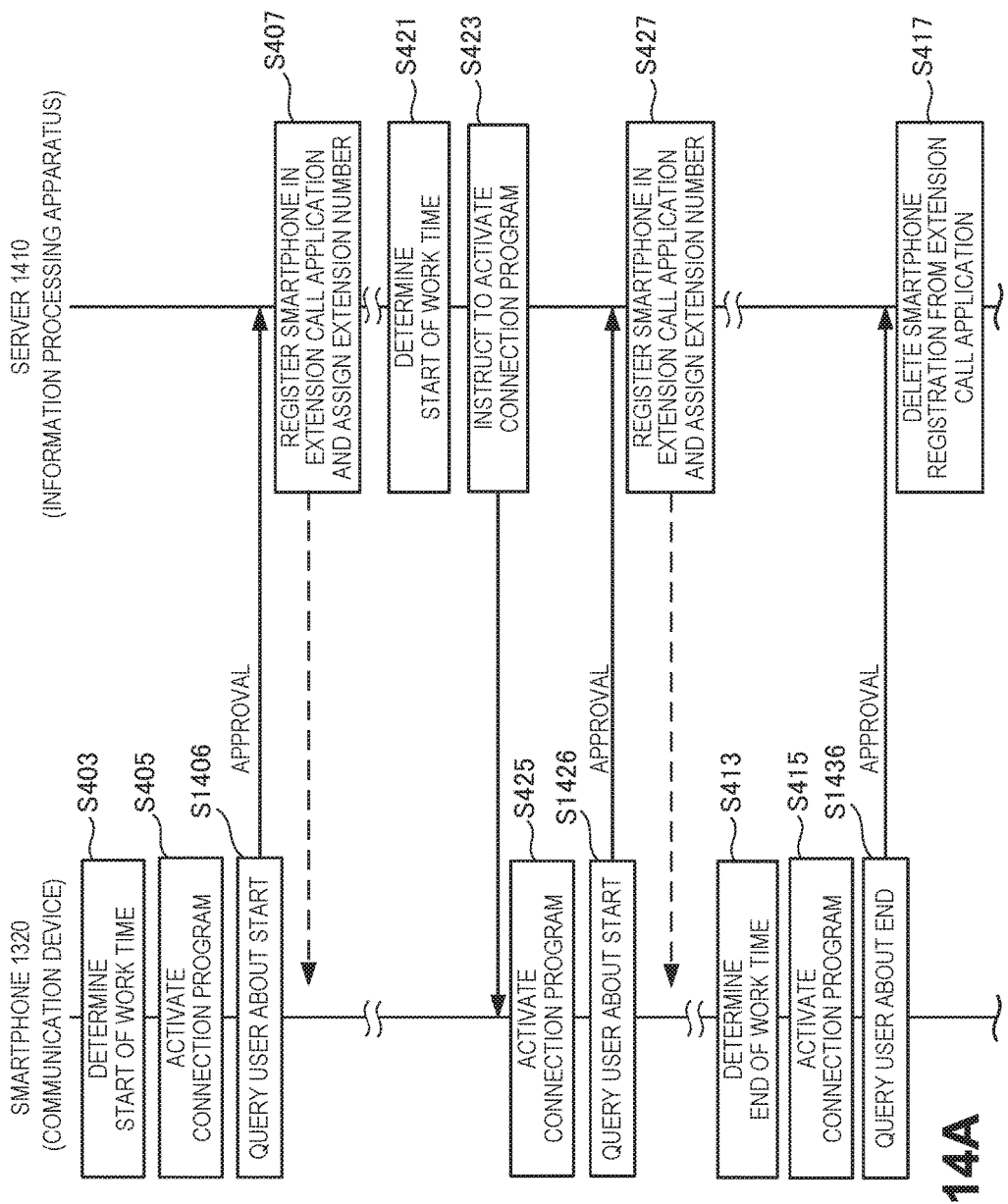
FIG. 14A is a sequence chart showing an operation procedure of the business support system according to the fourth embodiment of the present invention.

FIG. 14A is a sequence chart showing an operation procedure of the business support system 200 according to this embodiment. FIG. 14A shows the operation procedure of querying the user about the start or stop of the extension call application in correspondence with FIG. 13A. Note that the same step numbers as in FIG. 4A or 4B denote the same steps in FIG. 14A, and a repetitive description thereof will be omitted.

In a case in which the work time is determined in the smartphone 1320, as in FIG. 4A, if the smartphone 1320 designates "YES" on the display screen in the left view of FIG. 13A to approve the start in step S1406, a server 1410 registers the smartphone 1320 and assigns an extension number in step S407.

In a case in which the work time is determined in the server 1410, as in FIG. 4B, if the smartphone 1320 designates "YES" on the display screen in the left view of FIG. 13A to approve the start in step S1426, the server 1410 registers the smartphone 1320 and assigns an extension number in step S427.

In the case in which the work time is determined in the smartphone 1320, as in FIG. 4A, if the smartphone 1320 designates "YES" on the display screen in the right view of FIG. 13A to approve the stop in step S1436, the server 1410 deletes the registration of the smartphone 1320 in step S417.

Note that as for the query about the stop in the case in which the work time is determined in the server 1410, as in FIG. 4B, an illustration and description will be omitted to avoid repetition.

Figure 14B:
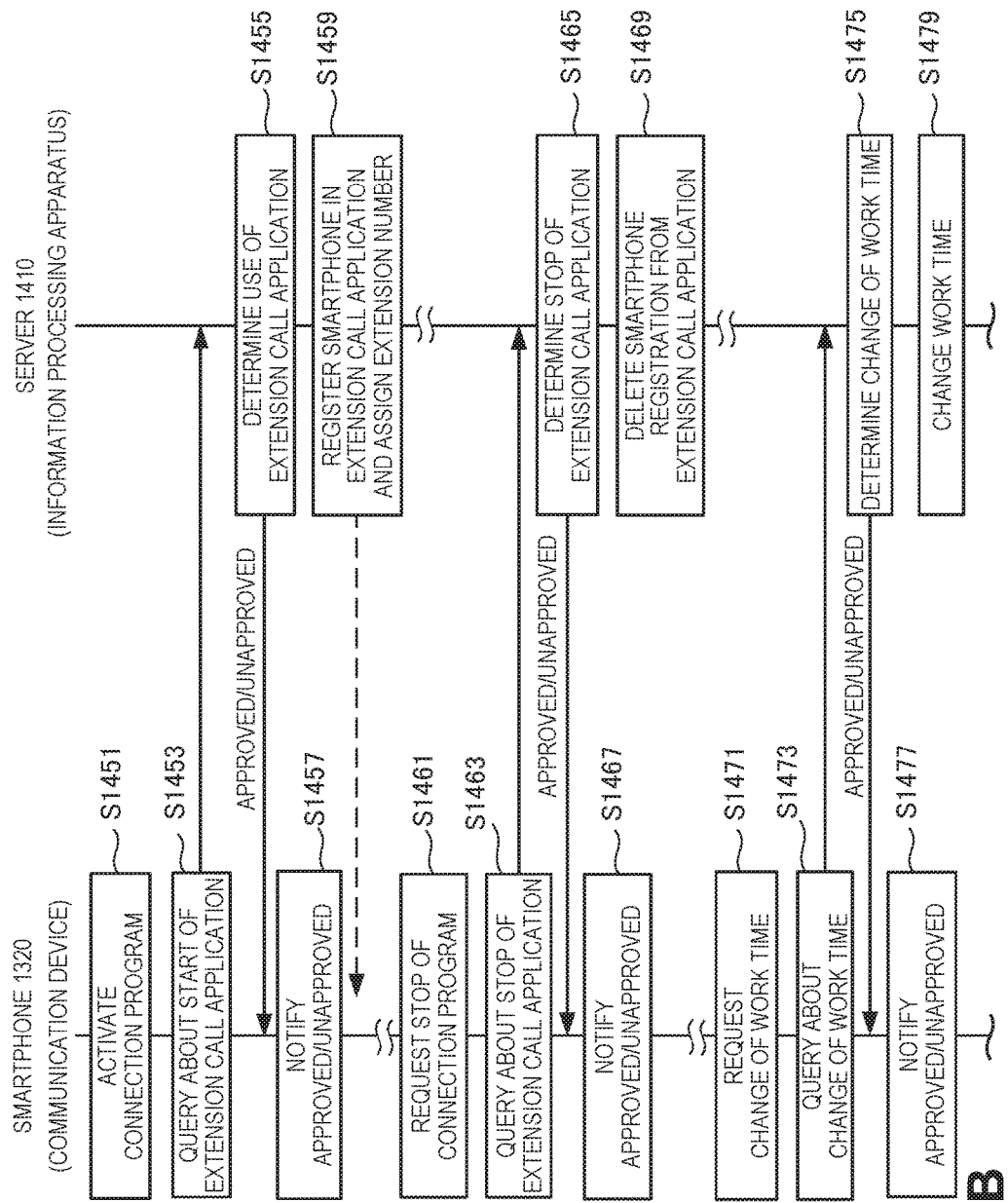
FIG. 14B is a sequence chart showing another operation procedure of the business support system according to the fourth embodiment of the present invention.

FIG. 14B is a sequence chart showing another operation procedure of the business support system 200 according to this embodiment. FIG. 14B shows the operation procedure of requesting, by the user, the start or stop of the extension call application and the operation procedure of changing the work time by the user in correspondence with FIG. 13B.

If the current time falls outside the work time, the smartphone 1320 activates the connection program in response to a user's request in step S1451, and queries the server 1410 in step S1453 whether the smartphone can receive the service of the extension call application.

In step S1455, the server 1410 determines whether the service of the extension call application can be started for the user or smartphone, and sends a notification to the smartphone 1320. In step S1457, the smartphone 1320 notifies the user of approved or unapproved. If the start of the service is approved, in step S1459, the server 1410 registers the smartphone 1320 in the extension call application, and assigns an extension number.

If the current time falls within the work time, and the smartphone is receiving the extension call service, the smartphone 1320 requests to stop the connection program by a user's request in step S1461, and queries the server 1410 in step S1463 whether the service of the extension call application can be stopped.

In step S1465, the server 1410 determines whether the service of the extension call application can be stopped for the user or smartphone, and sends a notification to the smartphone 1320. In step S1467, the smartphone 1320 notifies the user of approved or unapproved. If the stop of the service is approved, in step S1469, the server 1410 deletes the registration of the smartphone 1320 from the extension call application.

The smartphone 1320 requests to change the work time by a user's request in step S1471, and queries the server 1410 in step S1473 whether the work time can be changed In step S1475, the server 1410 determines whether the work time can be changed for the user or smartphone, and sends a notification to the smartphone 1320. In step S1477, the smartphone 1320 notifies the user of approved or unapproved. If the change of the work time is approved, in step S1479, the server 1410 changes the work time. Note that the description has been made here assuming that the work time is held by the server 1410. If the work time is held by the smartphone 1320, the work time of the smartphone 1320 is changed in step S1479.

«Processing Procedure of Smartphone and Server»

Figure 15A:
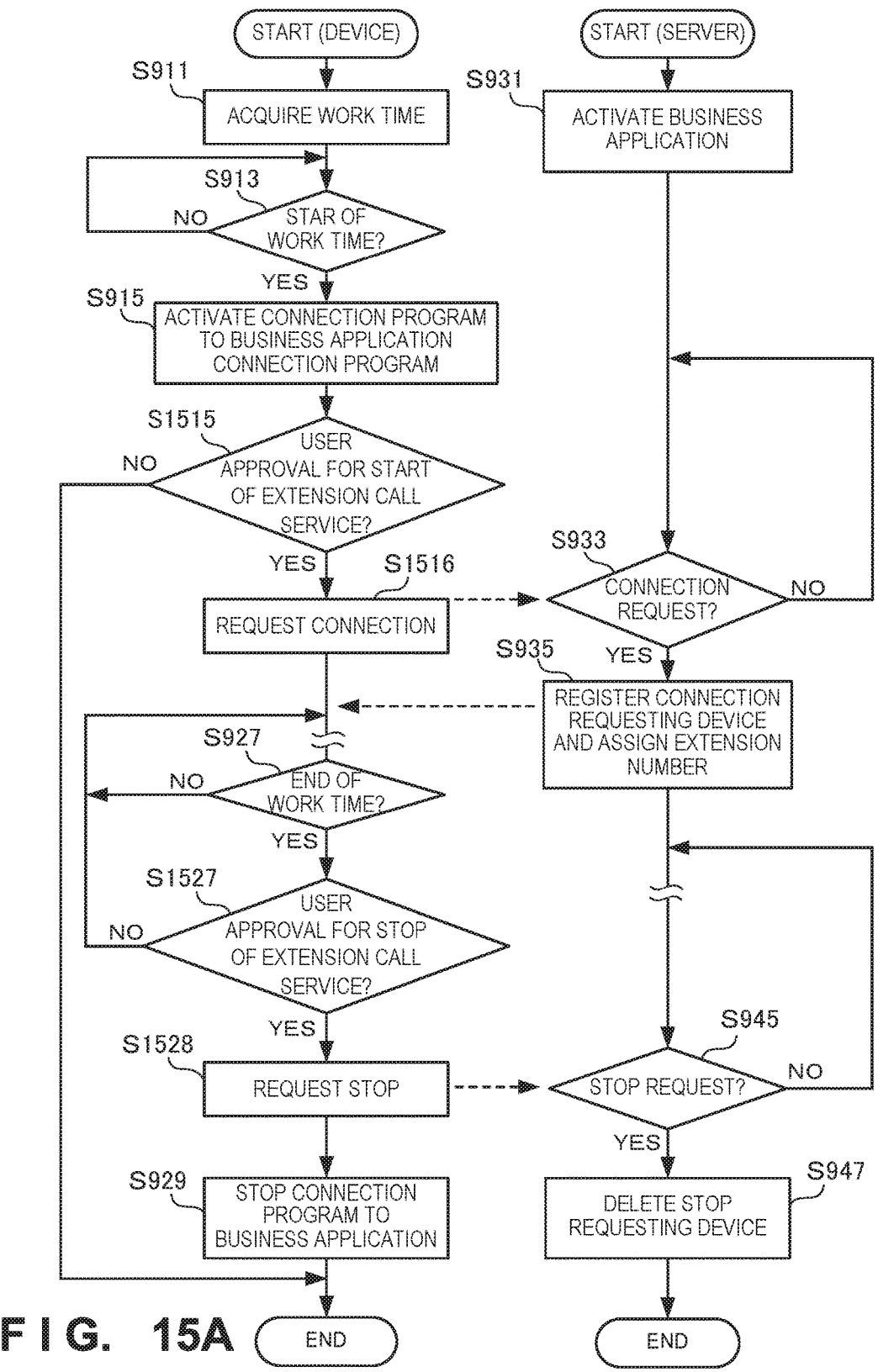
FIG. 15A is a flowchart showing a processing procedure of a smartphone and a server in the business support system according to the fourth embodiment of the present invention.

FIG. 15A is a flowchart showing a processing procedure of the smartphone 1320 and the server 1410 in the business support system 200 according to this embodiment. FIG. 15A shows the procedure of querying the start or stop of the extension call service corresponding to FIG. 14A. Note that the same step numbers as in FIG. 9A denote the same steps in FIG. 15A, and a repetitive description thereof will be omitted.

In step S1515, the smartphone 1320 queries the user whether to approve the start the extension call service, that is, the business use of the smartphone 1320, and waits for a user instruction. Upon receiving, from the user, a response to approve the start of the extension call service, in step S1516, the smartphone 1320 requests the server 1410 to start the extension call service.

In step S1527, the smartphone 1320 queries the user whether to approve the stop of the extension call service, that is, the stop of the business use of the smartphone 1320, and waits for a user instruction. Upon receiving, from the user, a response to approve the stop of the extension call service, in step S1528, the smartphone 1320 requests the server 1410 to stop the extension call service.

Figure 15B:
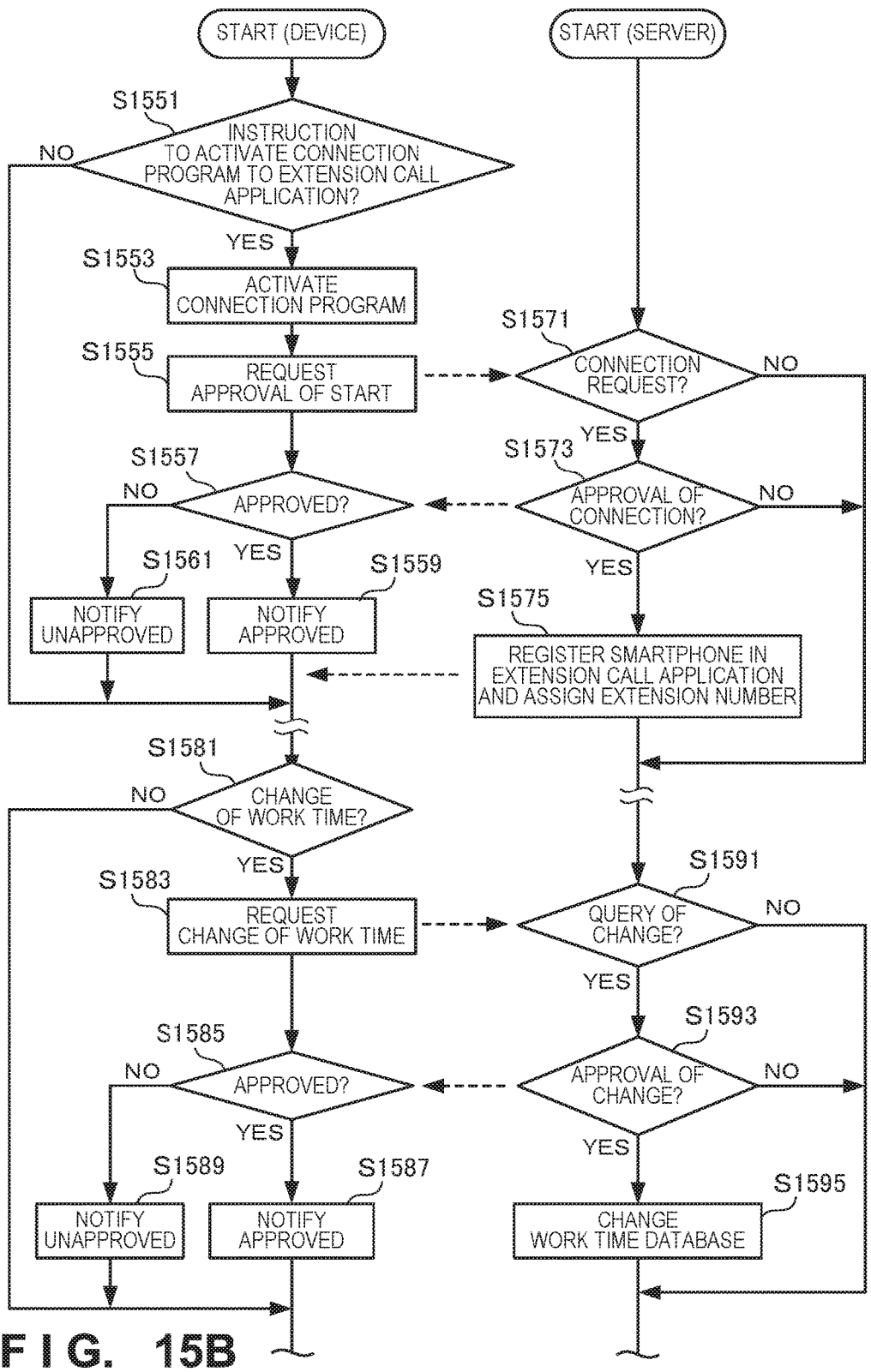
FIG. 15B is a flowchart showing another processing procedure of the smartphone and the server in the business support system according to the fourth embodiment of the present invention.

FIG. 15B is a flowchart showing another processing procedure of the smartphone 1320 and the server 1410 in the business support system 200 according to this embodiment. FIG. 15B shows the procedure of querying the start of the extension call service outside the work time, the stop of the extension call service received during the work time, or a change of the work time corresponding to FIG. 14B. Note that in FIG. 15B, an illustration and description of the stop of the extension call service received during the work time are omitted. The procedure is basically the same as that of the start of the extension call service outside the work time.

In step S1551, the smartphone 1320 determines whether to activate the connection program to the extension call application outside the work time. Upon determining to activate the connection program, in step S1553, the smartphone 1320 activates the connection program. In step S1555, the smartphone 1320 requests the server 1410 to approve the start of the extension call application.

In step S1571, the server 1410 waits for a connection request from the smartphone 1320. Upon receiving a connection request, in step S1573, the server 1410 determines whether to approve the extension call service outside the work time to the user or the smartphone 1320 that has requested, and notifies the determination result to the smartphone 1320. To approve the extension call service outside the work time, in step S1575, the server 1410 registers the smartphone 1320 in the extension call application and assigns an extension number.

In step S1557, the smartphone 1320 receives the approval/denial result notification from the server 1410. If the notification is approval, in step S1559, the smartphone notifies the user of the approved. On the other hand, if the notification is unapproved, in step S1561, the smartphone notifies the user of the unapproved.

In step S1581, the smartphone 1320 determines whether a work time change instruction from the user is received. If a work time change instruction from the user is received, in step S1583, the smartphone 1320 requests the server 1410 to change the work time.

In step S1591, the server 1410 waits for a work time change request from the smartphone 1320. Upon receiving a change request, in step S1593, the server 1410 determines whether to approve the requested work time change, and notifies the determination result to the smartphone 1320. To approve the work time change, in step S1595, the server 1410 changes the work time database.

In step S1585, the smartphone 1320 receives the approval/denial result notification from the server 1410. If the notification is approval, in step S1587, the smartphone notifies the user of the approved. On the other hand, if the notification is unapproved, in step S1589, the smartphone notifies the user of the unapproved.

According to this embodiment, the business support system queries about various kinds of processing shifts of the user, or determines whether to approve the processing shift by the user on the server side, thereby avoiding a forcible shift to the business use of the communication device independently of the user. It is therefore possible to use the communication device for business purpose efficiently and user-friendly.

Fifth Embodiment

A business support system according to the fifth embodiment of the present invention will be described next. The business support system according to this embodiment is different from the second to fourth embodiments in that a work time is not fixed to, for example, a defined business hours, and calendar information, individual schedule information, and the like are taken into consideration. The rest of components and operations is the same as in the second embodiment. Hence, the same reference numerals denote the same components and operations, and a detailed description thereof will be omitted.

(Work Time Database)

Figure 16:
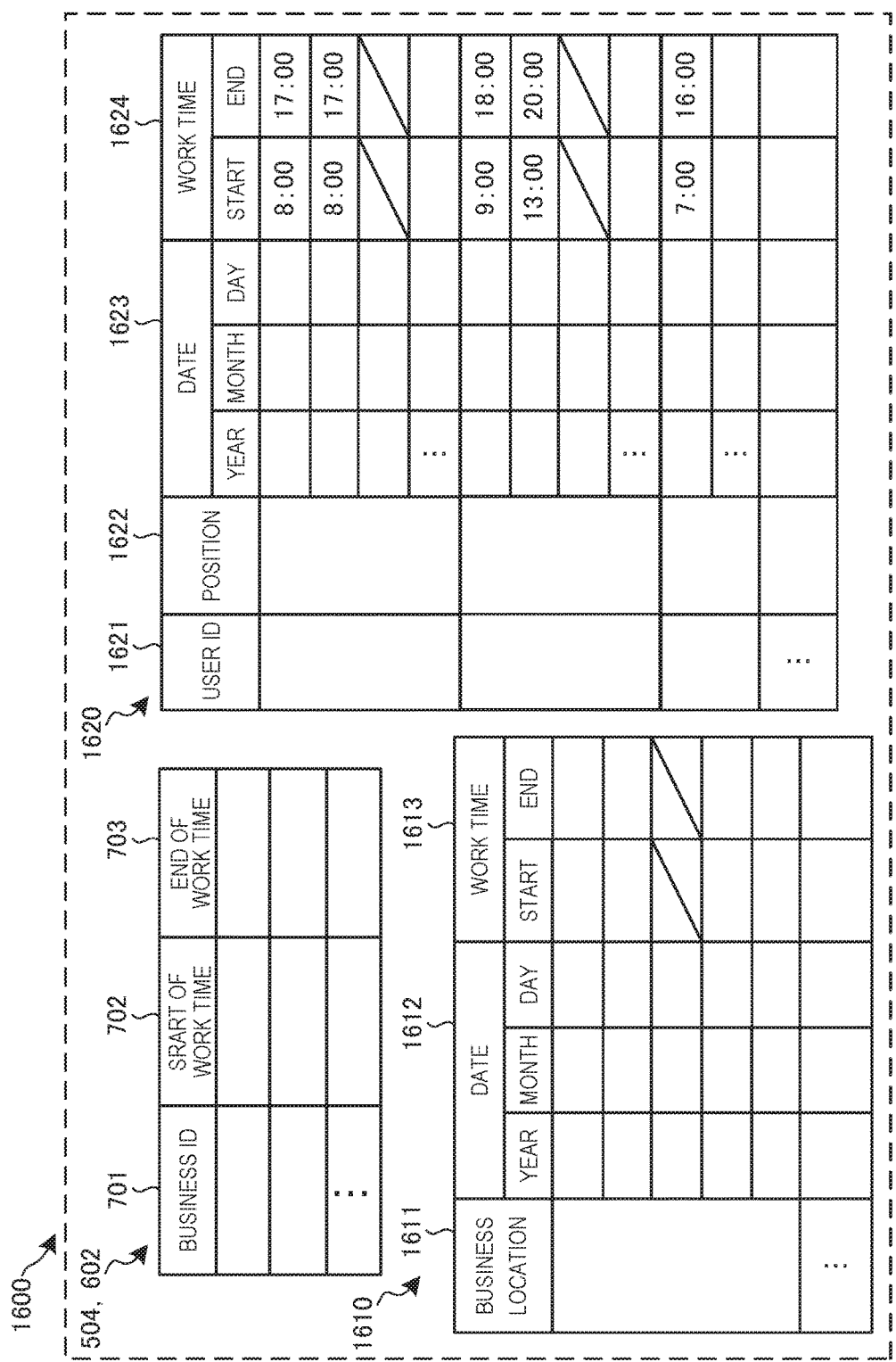
FIG. 16 is a view showing the arrangement of a work time database according to the fifth embodiment of the present invention.

FIG. 16 is a view showing the arrangement of a work time database 1600 according to this embodiment. Note that the same reference numerals as in FIG. 7 denote the same constituent elements in FIG. 16, and a description thereof will be omitted. The work time database 1600 shown in FIG. 16 includes a work time table 1610 corresponding to a calendar and a work time table 1620 corresponding to a schedule on a user basis in addition to a table shown FIG. 7. In this embodiment, the start or stop of an extension call application is controlled based on a work time considering at least one of the work time tables 1610 and 1620.

The work time table 1610 stores a date 1612 and a work time 1613 of each data in correspondence with a business location 1611. Note that the elements are associated with the business location 1611 because the calendar changes between, for example, an office building and a factory. Note that a calendar with different seasonal time offs is also usable.

The work time table 1620 stores a position 1622 in correspondence with a user ID 1621. The work time table 1620 also stores a date 1623 and a work time 1624 of each date in correspondence with the user ID 1621 and the position 1622. Note that the position 1622 is taken into consideration to clarify that a personal schedule is used as a work time according to this embodiment.

Note that control of the start or stop of the extension call application using the work time according to this embodiment is the same as described above except that the work time is different, and a repetitive description thereof will be omitted here.

According to this embodiment, it is possible to control to change the business use of a communication device based on not only the work time but also various set times.

Sixth Embodiment

A business support system according to the sixth embodiment of the present invention will be described next. The business support system according to this embodiment is different from the second to fifth embodiments in that various kinds of parameters used to control the business use of a communication device can be set by a user via the communication device. For example, in this embodiment, a work time setting unit sets the work time, and a control method setting unit sets a control method by a business use controller. The rest of components and operations is the same as in the second embodiment. Hence, the same reference numerals denote the same components and operations, and a detailed description thereof will be omitted.

«Work Support System»

The arrangement and operation of the business support system according to this embodiment will be described with reference to FIGS. 17 and 18.

(Display Screen of Smartphone)

Figure 17:
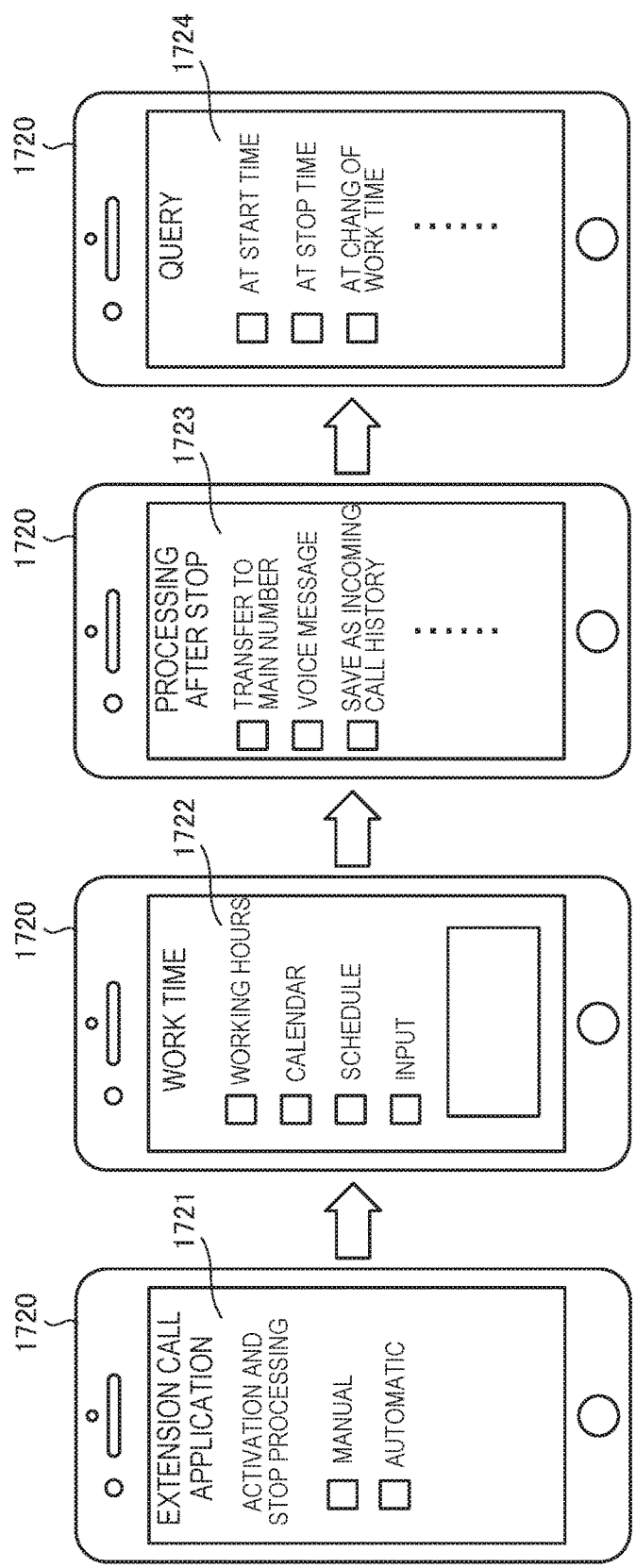
FIG. 17 is a view showing display screens of a smartphone by the operation of a business support system according to the sixth embodiment of the present invention.

FIG. 17 is a view showing display screens of a smartphone 1720 by the operation of a business support system 200 according to this embodiment. FIG. 17 shows an example in which four settings are sequentially done. However, each setting may be selected from a menu and set.

A display screen 1721 is a setting screen used to set whether to control the business use of the smartphone 1720 manually/automatically based on the work time. "Manual" is not the automatic shift of the business use based on the work time but a setting to inhibit the shift without a shift instruction of the user. "Automatic" is the automatic shift of the business use based on the work time, which is a setting to inhibit a shift instruction of the user.

A display screen 1722 is a setting screen used to select information (the information may include a plurality of pieces of information) to be used as the work time in a case in which the business use of the smartphone 1720 is automatically controlled. If a plurality of pieces of information are selected, the work time is set by combining the pieces of information. Note that "input" is used to input not an information selection but a work time, and is used when the work time is changed on a daily basis.

A display screen 1723 is a setting screen used to set processing after the smartphone 1720 is released from the business use at the end of the work time in a case in which the business use of the smartphone 1720 is automatically controlled. The above-described main number transfer, voice message, and saving as incoming call history in a case in which the business application is an extension call application are displayed.

A display screen 1724 is a setting screen used to set whether to query the user about the start or end of the business use from the smartphone 1720 at the start or end of the work time or whether to query the server at the time of setting change of a parameter such as a work time in a case in which the business use of the smartphone 1720 is automatically controlled.

(Operation Sequence)

Figure 18:
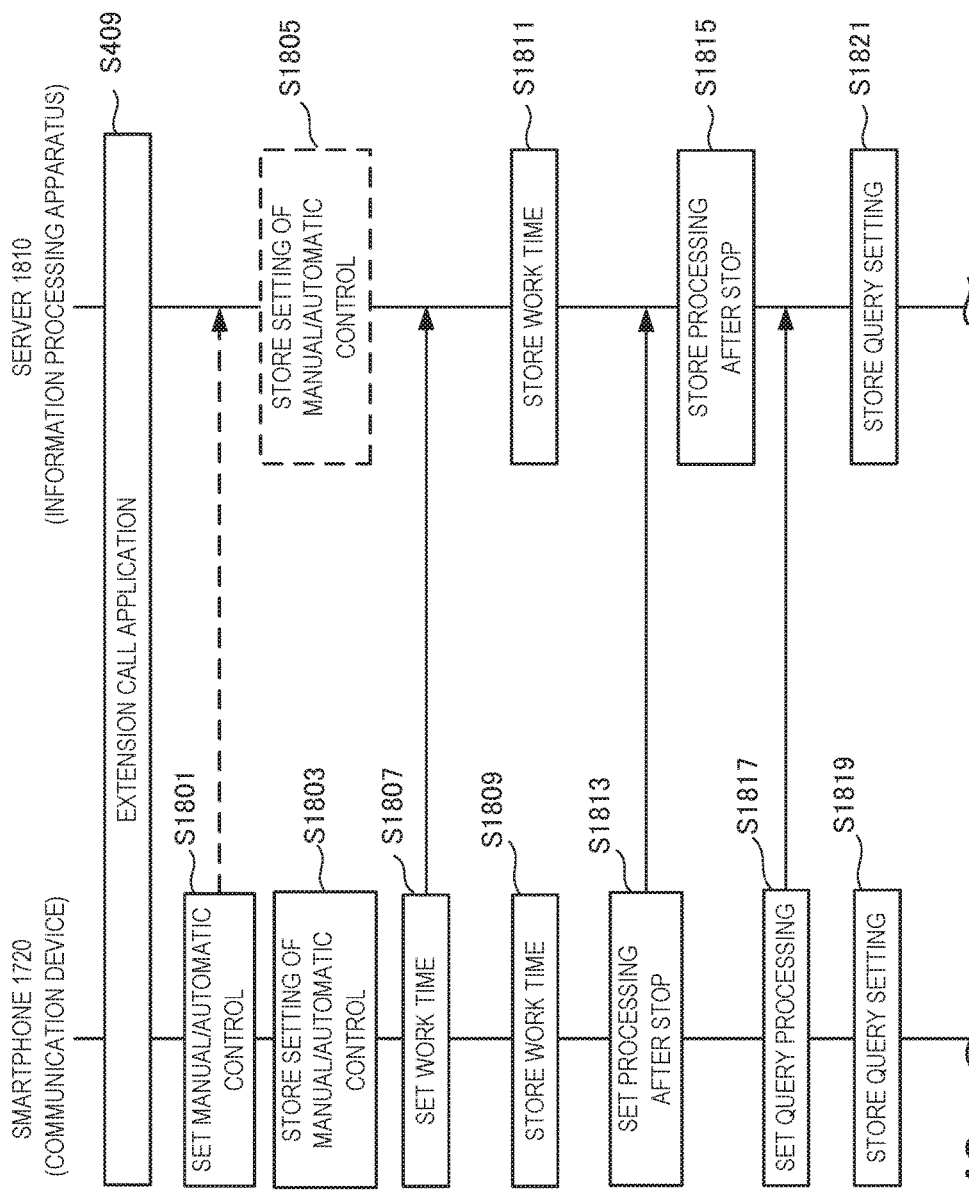
FIG. 18 is a sequence chart showing the operation procedure of the business support system according to the sixth embodiment of the present invention.

FIG. 18 is a sequence chart showing the operation procedure of the business support system 200 according to this embodiment.

Assume that in step S409, the extension call application is activated between the smartphone 1720 and a server 1810. In step S1801, if the manual/automatic control is set, the smartphone 1720 notifies the server 1810 of the setting information. In step S1803, the smartphone 1720 stores the setting information of manual/automatic control. In step S1805, the server 1810 stores the setting information of manual/automatic control.

In step S1807, if the work time to be used is set, the smartphone 1720 notifies the server 1810 of the setting information. In step S1809, the smartphone 1720 stores the setting information of the work time to be used. In step S1811, the server 1810 stores the setting information of the work time to be used. In step S1813, if processing after the stop of the business use is set, the smartphone 1720 notifies the server 1810 of the setting information. In step S1815, the server 1810 stores the setting information of the processing after the stop of the business use.

In step S1817, if whether to make a query is set, the smartphone 1720 notifies the server 1810 of the setting information. In step S1819, the smartphone 1720 stores the setting information of whether to make a query. In step S1821, the server 1810 stores the setting information of whether to make a query.

(Extension Call Processing Setting Table)

Figure 19:
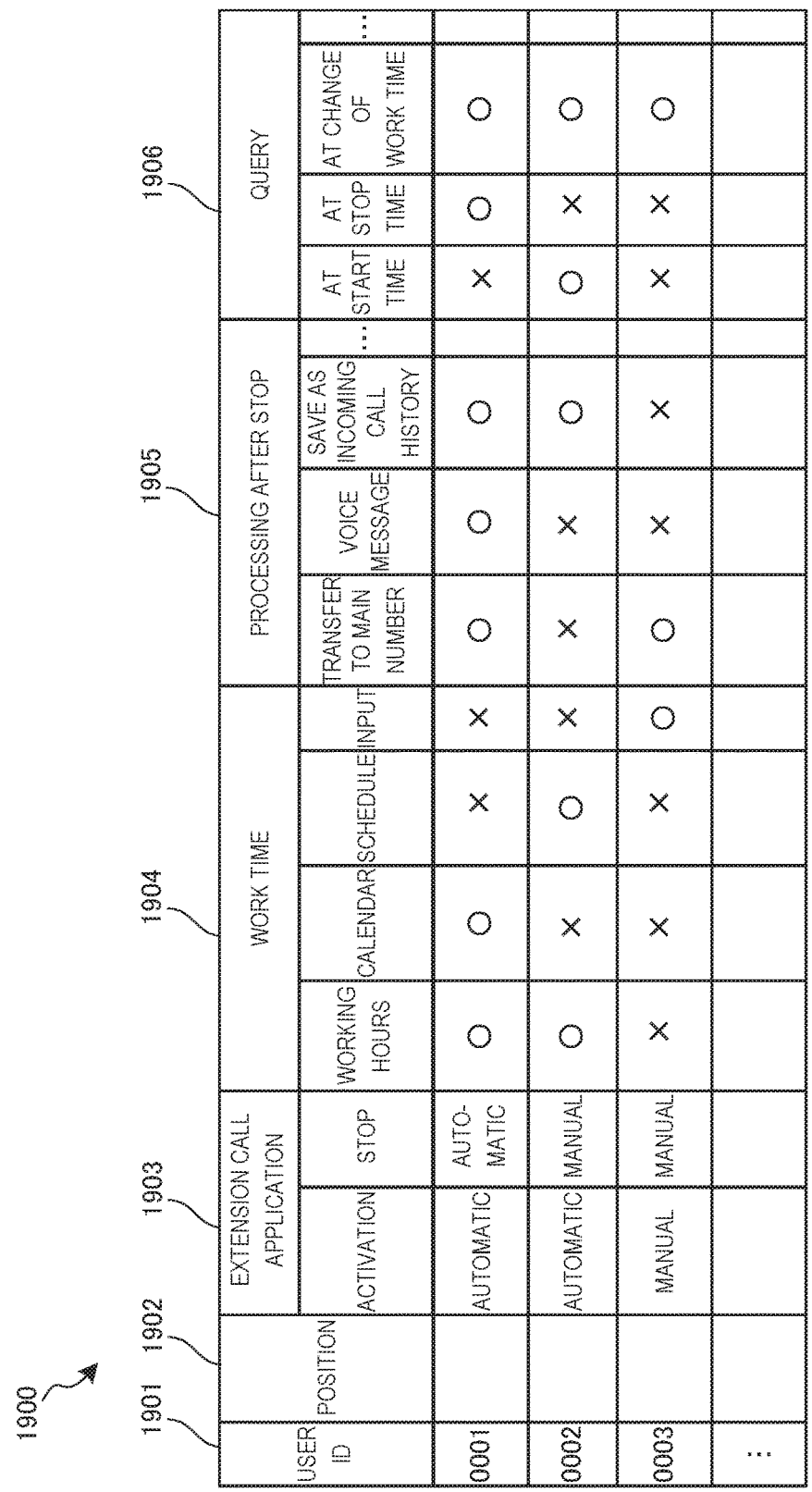
FIG. 19 is a view showing an extension call processing setting table in the business support system according to the sixth embodiment of the present invention.

FIG. 19 is a view showing an extension call processing setting table 1900 in the business support system 200 according to this embodiment. The extension call processing setting table 1900 is used by the smartphone 1720 or the server 1810 to store the settings and referred to for execution of processing corresponding to the settings when performing the processing.

The extension call processing setting table 1900 stores a position 1902, information 1903 representing whether to automatically or manually control business use including an extension call service, information 1904 representing a work time with which data to be used is associated, information 1905 of processing after the stop of the business use, and information 1906 representing whether to query a user or server at the time of processing in association with a user ID 1901. Note that in the pieces of information 1904 to 1906, a cell of ○ indicates that a setting is done, and a cell of x indicates that a setting is not done.

«Processing Procedure of Smartphone»

Figure 20:
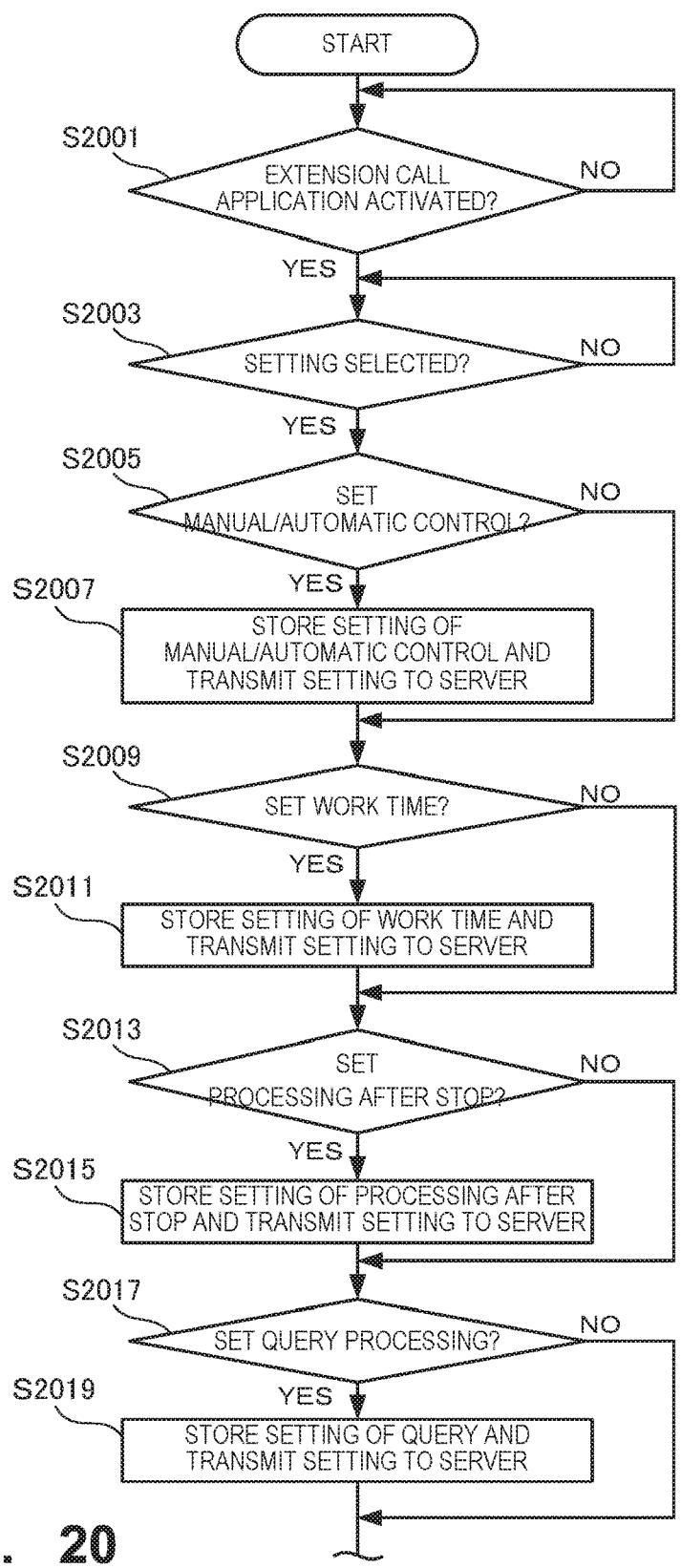
FIG. 20 is a flowchart showing the processing procedure of a smartphone in the business support system according to the sixth embodiment of the present invention.

FIG. 20 is a flowchart showing the processing procedure of a smartphone 1720 in the business support system 200 according to this embodiment. This flowchart is executed by the CPU of the smartphone 1720 using memories to implement the functions of the smartphone 1720.

In step S2001, the smartphone 1720 waits for activation of an extension call application. If the extension call application is activated, in step S2003, the smartphone 1720 waits for selection of a menu to be set. If a menu to be set is selected, in step S2005, the smartphone 1720 displays the display screen 1721 shown in FIG. 17 and waits for the setting of manual or automatic control. If the setting of manual or automatic control is done, in step S2007, the smartphone 1720 stores the setting of manual or automatic control and transmits it to the server 1810. Then, in step S2009, the smartphone 1720 waits for the setting concerning the work time. If the setting of manual or automatic control is not done, the smartphone 1720 advances to step S2009.

If the setting concerning the work time is done, in step S2011, the smartphone 1720 stores the setting concerning the work time and transmits it to the server 1810. Then, in step S2013, the smartphone 1720 waits for the setting of processing after the stop of business use. If the setting concerning the work time is not done, the smartphone 1720 advances to step S2013.

If the setting of processing after the stop of business use is done, in step S2015, the smartphone 1720 transmits the setting of processing after the stop of business use to the server 1810. Then, in step S2017, the smartphone 1720 waits for the setting concerning a query. If the setting of processing after the stop of business use is not done, the smartphone 1720 advances to step S2017.

If the setting concerning a query is done, in step S2019, the smartphone 1720 stores the setting concerning a query and transmits it to the server 1810. Then, the setting processing according to this embodiment ends. If the setting concerning a query is not done, the setting processing according to this embodiment ends.

According to this embodiment, various kinds of parameters used to control the business use of the communication device can be set by the user via the communication device. It is therefore possible to achieve business use of the communication device adapted to an individual.

Seventh Embodiment

A business support system according to the seventh embodiment of the present invention will be described next. The business support system according to this embodiment is different from the second to sixth embodiments in that not only a work time is used to control business use of a communication device, but also the position information of the communication device is used to control the start and stop of business use of the communication device. The rest of components and operations is the same as in the second embodiment. Hence, the same reference numerals denote the same components and operations, and a detailed description thereof will be omitted.

«Outline of Operation of Work Support System»

Figure 21:
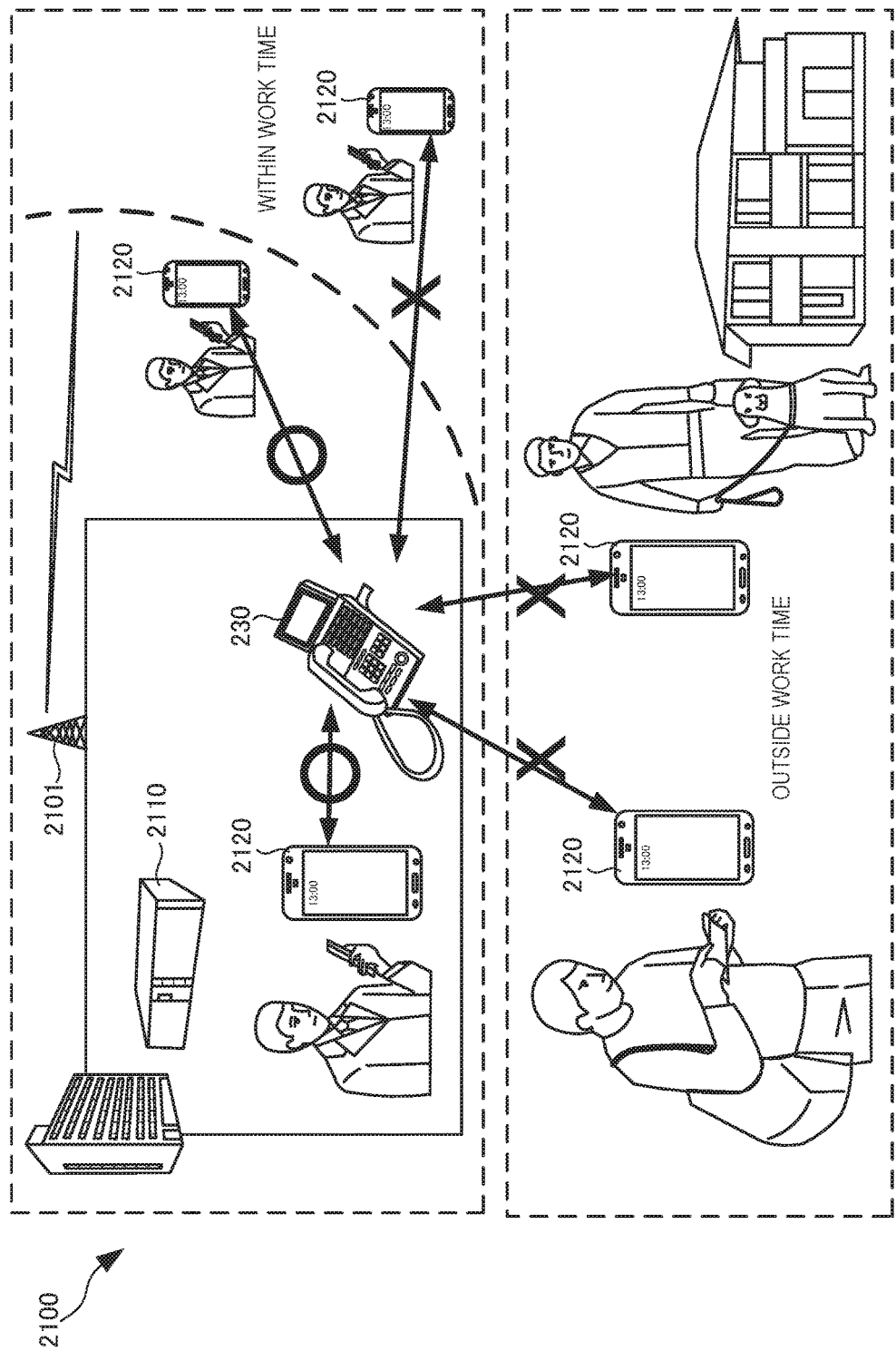
FIG. 21 is a view showing the outline of the operation of a business support system according to the seventh embodiment of the present invention.

FIG. 21 is a view showing the outline of the operation of a business support system 2100 according to this embodiment. Note that the same reference numerals as in FIG. 2 denote the same constituent components in FIG. 21, and a detailed description thereof will be omitted.

FIG. 21 illustrates "within a work time" indicated by a broken line and "outside a work time" indicted by another broken line. Within the work time, a server 2110 that provides the service of an extension call application and an in-house IP telephone 230 exist, and an extension call can always be made. In FIG. 21, a transmitter 2101 that transmits a radio wave is further provided. If a smartphone 2120 enters the range where it can receive the radio wave, the smartphone shifts to business use. If the smartphone 2120 exits the range where it can receive the radio wave, the smartphone is released from the business use.

As for the smartphone 2120 within the work time, the smartphone is used for business purpose irrespective of its location, that is, in or outside the company. The service of the extension call application is provided, and an extension call by the smartphone 2120 is possible. Within the range where the smartphone can receive the radio wave transmitted from the transmitter 2101, the smartphone is used for a business purpose. However, if the radio wave transmitted from the transmitter 2101 cannot be received, the smartphone cannot be used for business purpose. That is, in FIG. 21, the smartphone 2120 is used for business purpose only within the work time and only at a position where the smartphone can receive the radio wave transmitted from the transmitter 2101. Note that the AND of the work time and the position where the radio wave can be received need not always be used as the condition of business use. Another condition such as an OR may be used.

On the other hand, as for the smartphone 2120 outside the work time, business use is stopped, the service of the extension call application is not provided, and an extension call by the smartphone 2120 is impossible.

Note that the relationship between the work time and the business use of the smartphone 2120 has been described with reference to FIG. 21 using the extension call application as an example of the business application. However, any other business application can obtain the same effects as described above.

Note that in this embodiment, the start and stop of the business use of the communication device are controlled by the radio wave reception range of the portable device. However, the start and stop of the business use of the communication device may be controlled based on, for example, position information obtained by a GPS (Global Positioning System) or the like.

According to this embodiment, the start and stop of business use of the communication device are controlled not only by the work time but also by the position information of the communication device. It is therefore possible to achieve business use of the communication device more adapted to the form of business.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention may be applied to a system including a plurality of devices or may be applied to a single apparatus. The present invention is also applicable even when a control program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

Other Expressions of Embodiments

Some or all of the above-described embodiments can also be described as in the following supplementary notes but are not limited to the followings.

(Supplementary Note 1)

There is provided a business support system comprising:
a work time register that registers a work time; and
a business use controller that refers to the work time register, starts business use of a communication device by a business application for supporting the business use of the communication device if a current time falls within the work time, and stops the business use of the communication device by the business application if the current time falls outside the work time.

(Supplementary Note 2)

There is provided the business support system according to supplementary note 1, wherein the business use controller starts the business use of the communication device by the business application by activating a predetermined program in the communication device, and stops the business use of the communication device by the business application by stopping the predetermined program in the communication device.

(Supplementary Note 3)

There is provided the business support system according to supplementary note 1 or 2, further comprising a work time setting unit that sets the work time.

(Supplementary Note 4)

There is provided the business support system according to supplementary note 3, further comprising a control method setting unit that sets a control method by the business use controller.

(Supplementary Note 5)

There is provided the business support system according to any one of supplementary notes 1 to 4, wherein the work time register further registers at least one of calendar information and schedule information.

(Supplementary Note 6)

There is provided the business support system according to any one of supplementary notes 1 to 5, wherein the business application is an extension call application associated with a work.

(Supplementary Note 7)

There is provided the business support system according to supplementary note 6, wherein if the business use of the communication device by the extension call application is stopped, the business use controller starts at least one processing of transfer to a main number, switching to a voice message, and saving of an incoming call history.

(Supplementary Note 8)

There is provided the business support system according to any one of supplementary notes 1 to 7, wherein the business use controller comprises:
a query unit that queries whether to execute at least one of a start and a stop of the business use of the communication device by the business application; and
an approver that accepts approval of execution for the query of the query unit.

(Supplementary Note 9)

There is provided the business support system according to supplementary note 8, wherein the query unit is included in a server provided in the business support system and queries the communication device provided in the business support system about at least one of the start of the business use of the communication device by the business application and the stop of the business use of the communication device by the business application, and the approver is included in the communication device.

(Supplementary Note 10)

There is provided the business support system according to supplementary note 8, wherein the query unit is included in the communication device provided in the business support system and queries a server provided in the business support system about at least one of the start of the business use of the communication device by the business application outside the work time, the stop of the business use of the communication device by the business application within the work time, and a change of the work time, and the approver is included in the server.

(Supplementary Note 11)

There is provided the business support system according to any one of supplementary notes 1 to 10, wherein the business use controller further starts and stops the business use of the communication device in consideration of position information of the communication device.

(Supplementary Note 12)

There is provided the business support system according to supplementary note 4, wherein each of the work time setting unit, the work time register, the business use controller, and the control method setting unit is included in one of a server for providing a business support and the communication device for receiving the business support, which are included in the business support system.

(Supplementary Note 13)

There is provided a business support method comprising:

referring to a work time register that registers a work time and starting business use of a communication device by a business application for supporting the business use of the communication device if a current time falls within the work time; and stopping the business use of the communication device by the business application if the current time falls outside the work time.

(Supplementary Note 14)

There is provided an information processing apparatus comprising:

a work time register that registers a work time; and a business use controller that refers to the work time register, starts support to a communication device by a business application for supporting business use of the communication device if a current time falls within the work time, and stops the support to the communication device by the business application if the current time falls outside the work time.

(Supplementary Note 15)

There is provided a control method of an information processing apparatus, comprising:

referring to a work time registered in a work time register, and starting support to a communication device by a business application for supporting business use of the communication device if a current time falls within the work time; and stopping the support to the communication device by the business application if the current time falls outside the work time.

(Supplementary Note 16)

There is provided a control program of an information processing apparatus, which causes a computer to execute a method comprising:

referring to a work time registered in a work time register, and starting support to a communication device by a business application for supporting business use of the communication device if a current time falls within the work time; and stopping the support to the communication device by the business application if the current time falls outside the work time.

(Supplementary Note 17)

There is provided a communication device comprising:

a work time register that registers a work time; and a business use controller that refers to the work time register, activates a predetermined program and requests support from an information processing apparatus by a business application for supporting business use of the communication device if a current time falls within the work time, and stops the predetermined program and rejects the support from the information processing apparatus by the business application if the current time falls outside the work time.

(Supplementary Note 18)

There is provided a control method of a communication device, comprising:

referring to a work time registered in a work time register, and activating a predetermined program and requesting support from an information processing apparatus by a business application for supporting business use of the communication device if a current time falls within the work time; and stopping the predetermined program and rejecting the support from the information processing apparatus by the business application if the current time falls outside the work time.

(Supplementary Note 19)

There is provided a control program of a communication device, which causes a computer to execute a method comprising:

referring to a work time registered in a work time register, and activating a predetermined program and requesting support from an information processing apparatus by a business application for supporting business use of the communication device if a current time falls within the work time; and stopping the predetermined program and rejecting the support from the information processing apparatus by the business application if the current time falls outside the work time.

What is claimed is:

1. A business support system comprising:

an information processing apparatus for providing a business support; and a communication device for receiving the business support, the communication device comprising:

a timer that counts a current time;

a work time register that registers a work time;

a first memory storing first instructions; and a first processor structured to execute the first instructions to:

determine whether the current time falls within the work time or outside the work time in reference to said work time register;

when it has been determined that the current time falls within the work time, receive and hold an identifier assigned from the information processing apparatus, and start business use of the communication device using the assigned identifier and a network address of the communication device by a business application for supporting the business use of the communication device; and when it has been determined that the current time falls outside the work time, erases the assigned identifier and stops the business use of the communication device by the business application, and the information processing apparatus comprising:
a registration unit registering communication devices of which the current time has fallen within the work time
a second memory storing second instructions; and
a second processor configured to execute the second instructions to:
when receiving, from the communication device, that the current time has fallen within the work, assign the identifier to the communication device, register the identifier and the network address in the registration unit in association with each other and start to support the business use of the communication device; and
when receiving, from the communication device, that the current time has fallen outside the work, delete the identifier and the network address from the registration unit and stop to support the business use of the communication device.

2. The system according to claim 1, wherein the first processor is configured to execute the first instructions to start the business use of the communication device by the business application by activating a predetermined program for communicating with the information processing apparatus for the business use in the communication device, and stop the business use of the communication device by the business application by stopping the predetermined program in the communication device.

3. The system according to claim 1, wherein the first processor is further configured to execute the first instructions to:
set the work time in said work time register; and
determine whether the current time falls within the set work time or outside the set work time.

4. The system according to claim 3, wherein the first processor is further configured to execute the first instructions to set a control method in the business use of the communication device.

5. The system according to claim 1, wherein said work time register further registers at least one of calendar information and schedule information from which the work time is determined, and
the first processor is further configured to execute the first instructions to determine, using the work time determined from the at least one of calendar information and schedule information, whether the current time falls within the work time or outside the work time.

6. The system according to claim 1, wherein the business application is an extension call application providing an extension call associated with a business, and the identifier is an extension number.

7. The system according to claim 6, wherein when the business use of the communication device by the extension call application is stopped, the second processor is configured to execute the second instructions to start at least one processing of transferring an extension call to a main number call, switching the extension call to a voice message response, and saving the extension call in an incoming call history.

8. The system according to claim 1, wherein the first processor is further configured to execute the first instructions to:
send a query whether to execute at least one of a start and a stop of the business use of the communication device by the business application; and
accept approval of execution in response to the query.

9. The system according to claim 1, wherein the first processor is further configured to execute the first instructions to send a query to the information processing apparatus whether to execute at least one of a start of the business use of the communication device by the business application outside the work time, a stop of the business use of the communication device by the business application within the work time, and a change of the work time, and accepts the approval of execution from the information processing apparatus.

10. The system according to claim 1, wherein the communication device further comprises a position detector detecting a position of the communication device, the first processor is configured to execute the first instructions to send position information of the communication device to the information processing apparatus, and the second processor is configured to execute the second instructions to start and stop the business use of the communication device in consideration of the position information of the communication device.

11. A business support system comprising:
an information processing apparatus for providing a business support; and
a communication device for receiving the business support,
the information processing apparatus comprising:
a timer that counts a current time;
a work time register that registers a work time;
a registration unit registering communication devices of which the current time has fallen within the work time;
a second memory storing second instructions; and
a second processor structured to execute the second instructions to:
determine whether the current time falls within the work time or outside the work time in reference to said work time register;
assign an identifier used for a business use of the communication device to the communication device, register the identifier and a network address of the communication device in the registration unit in association with each other, and start to support the business use of the communication device by the business application for supporting the business use of the communication device, when it has been determined that the current time falls within the work time; and
delete the identifier and the network address from the registration unit and stop to support the business use of the communication device by the business application, when it has been determined that the current time falls outside the work time, and
the communication device comprising:
a first memory storing first instructions; and
a first processor configured to execute the first instructions to:

receive and hold the identifier assigned from the information processing apparatus when the current time has fallen within the work time, and start the business use of the communication device using the assigned identifier and the network address by the business application; and when receiving, from the information processing apparatus, that the current time has fallen outside the work time, erases the assigned identifier and stops the business use of the communication device by the business application.

12. The system according to claim 11, wherein the first processor is configured to execute the first instructions to start the business use of the communication device by the business application by activating a predetermined program for communicating with the information processing apparatus for the business use in the communication device, and stop the business use of the communication device by the business application by stopping the predetermined program in the communication device.

13. The system according to claim 11, wherein the second processor is further configured to execute the second instructions to:

set the work time in said work time register; and determine whether the current time falls within the set work time or outside the set work time.

14. The system according to claim 13, wherein the first processor is further configured to execute the first instructions to set a control method in the business use of the communication device.

15. The system according to claim 11, wherein said work time register further registers at least one of calendar information and schedule information from which the work time is determined, and the second processor is further configured to execute the second instructions to determine, using the work time determined from the at least one of calendar information and schedule information, whether the current time falls within the work time or outside the work time.

16. The system according to claim 11, wherein the business application is an extension call application providing an extension call associated with a business, and the identifier is an extension number.

17. The system according to claim 11, wherein the communication device further comprises a position detector detecting a position of the communication device, the first processor is configured to execute the first instructions to send position information of the communication device to the information processing apparatus, and the second processor is configured to execute the second instructions to start and stop the business use of the communication device in consideration of the position information of the communication device.

18. A method of supporting a business, comprising:

determining whether a current time falls within a work time or outside the work time in reference to the current time counted by a timer and a work time registered in a work time register;

when it has been determined that the current time falls within the work time, assigning an identifier used for business use of a communication device to the communication device, registering the identifier and a network address of the communication device in association with each other, and starting the business use of the communication device using the assigned identifier and the network address by a business application for supporting the business use of the communication device; and when it has been determined that the current time falls outside the work time, erasing the assigned identifier from the communication device, deleting a registration of the identifier and the network address, and stopping the business use of the communication device by the business application.

19. A non-transitory computer readable medium storing a program executed by an information processing apparatus for providing a business support to a communication device, the method comprising:

determining whether a current time falls within a work time or outside the work time in reference to the current time counted by a timer and the work time registered in a work time register;

when it has been determined that the current time falls within the work time, assigning an identifier used for business use of the communication device to the communication device, registering the identifier and a network address of the communication device in association with each other, and starting to support the business use of the communication device using the assigned identifier and the network address by the business application, and when it has been determined that the current time falls outside the work time, deleting a registration of the identifier and the network address, and stopping to support the business use of the communication device by the business application.

20. A non-transitory computer readable medium storing a program executed by a communication device for receiving a business support from an information processing apparatus, the method comprising:

determining whether a current time falls within a work time or outside the work time in reference to the current time counted by a timer and the work time registered in a work time register;

when it has been determined that the current time falls within the work time, activating a predetermined program for communicating with an information processing apparatus, requesting the information processing apparatus to assign an identifier used for business use of the communication device to the communication device and provide support using the assigned identifier and a network address of the communication device by the business application, receiving and holding the identifier assigned from the information processing apparatus, and start to receive, and when it has been determined that the current time falls outside the work time, erasing the assigned identifier, stopping the predetermined program, and rejecting the support by the business application from the information processing apparatus.

* * * * *